(12) United States Patent
Asano et al.

(10) Patent No.: US 11,239,492 B2
(45) Date of Patent: Feb. 1, 2022

(54) SOLID ELECTROLYTE MATERIAL AND BATTERY

(71) Applicant: Panasonic Intellectual Property Management Co., Ltd., Osaka (JP)

(72) Inventors: Tetsuya Asano, Nara (JP); Akihiro Sakai, Nara (JP); Satoru Ohuchi, Hyogo (JP); Masashi Sakaida, Hyogo (JP); Akinobu Miyazaki, Osaka (JP); Shinya Hasegawa, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 196 days.

(21) Appl. No.: 16/198,762

(22) Filed: Nov. 22, 2018

(65) Prior Publication Data
US 2019/0088995 A1     Mar. 21, 2019

Related U.S. Application Data

(63) Continuation of application No. PCT/JP2017/024934, filed on Jul. 7, 2017.

(30) Foreign Application Priority Data

Aug. 4, 2016   (JP) .............................. JP2016-153736
Jun. 8, 2017   (JP) .............................. JP2017-113102

(51) Int. Cl.
*H01M 10/0562*     (2010.01)
*H01M 10/052*      (2010.01)
(Continued)

(52) U.S. Cl.
CPC ......... *H01M 10/0562* (2013.01); *C01F 17/36* (2020.01); *H01B 1/06* (2013.01);
(Continued)

(58) Field of Classification Search
CPC ....... H01M 10/05–0525; H01M 10/056–0562; H01M 10/058–0587;
(Continued)

(56) References Cited

U.S. PATENT DOCUMENTS 6,428,935 B1 *  8/2002  Takada ................... H01M 4/13
                                                       429/218.1
2012/0301796 A1  11/2012  Ohtomo et al.
2016/0329598 A1  11/2016  Schneider et al.

FOREIGN PATENT DOCUMENTS

JP    2006-244734      9/2006
JP    2011-129312      6/2011
WO    2015/110385 A1   7/2015

OTHER PUBLICATIONS

Machine translation of Bohnsack et al.; "Ternare Halogenide vom Typ A3MX6 VI. Ternare Chloride der Selten-Erd-Elemente mit Lithium, Li3MCI6 (M=Tb—Lu, Y, Sc): Synthese, Kristallstrukturen und Ionenbewegung." Zeitschrift Fur Anorganische und Allgemeine Chemie, vol. 623, Jul. 1, 1997, pp. 1067-1073. (Year: 1997).*
The Extended European Search Report dated Jul. 8, 2019 for European Patent Application No. 17836689.4.
(Continued)

*Primary Examiner* — Jonathan Crepeau
*Assistant Examiner* — Jacob Buchanan
(74) *Attorney, Agent, or Firm* — Greenblum & Bernstein, P.L.C.

(57) ABSTRACT

A solid electrolyte material according to an aspect of the present disclosure is represented by the following Compositional Formula (1):

$$Li_{6-3z}Y_zX_6$$

where, $0<z<2$ is satisfied; and X represents Cl or Br.

16 Claims, 7 Drawing Sheets

(51) Int. Cl.
*H01M 10/0585* (2010.01)
*H01M 10/0525* (2010.01)
*H01B 1/06* (2006.01)
*C01F 17/36* (2020.01)

(52) U.S. Cl.
CPC ..... *H01M 10/052* (2013.01); *H01M 10/0525* (2013.01); *H01M 10/0585* (2013.01); *C01P 2002/72* (2013.01); *C01P 2002/74* (2013.01); *C01P 2002/76* (2013.01); *H01M 2300/008* (2013.01)

(58) Field of Classification Search
CPC ........... H01M 50/40–409; H01M 50/431–437; H01M 50/489; H01M 50/497; C01F 17/30; C01F 17/36; H01B 1/06; C01P 2002/70–77
See application file for complete search history.

(56) References Cited

OTHER PUBLICATIONS

Andreas Bohnsack et al: "Ternare Halogenide vom Typ A3MX6. VI [I] Ternare Chloride der Selten-Erd-Elemente mit Lithium, Li3MCl6 (M=Tb—Lu, Y, Sc): Synthese, Kristallstruktur, Ionenbeweglichkeit Ternary Halides of the A3MX6 Type. VI. Ternary Chlorides of the Rare-Earth Elements with Lithium, Li3LnCl6 (Ln: Tb—Lu, Y, Sc):", Zeitschrift Fur Anorganische Und Allgemeine Chemie, vol. 623, Jul. 1, 1997 (Jul. 1, 1997), pp. 1067-1073. XP055600040.
Andreas Bohnsack et al."Ternare Halogenide vom Typ A3MX6. VII [I] Die Bromide LI3MBr6 (M=Sm—Lu, Y): Synthese, Kristallstruktur, Ionenbeweglichkeit Ternary Halides of the A3MXBType. VII. The Bromides Li3MBr6 (M=Sm—Lu, Y): Synthesis, Crystal Structure, and Ionic Mobility", Zeitschrift Fur Anorganische Allgemeine Chemie, vol. 623, Sep. 1, 1997 (Sep. 1, 1997), pp. 1352-1356, XP055600030.
International Search Report of PCT application No. PCT/JP2017/024934 dated Aug. 8, 2017.
English Translation of Chinese Search Report dated Sep. 8, 2021 for Chinese Patent Application No. 201780011697.4.

\* cited by examiner

SITE HAVING A Li OCCUPANCY OF LESS THAN 1

SITE HAVING A Li OCCUPANCY OF LESS THAN 1

SOLID ELECTROLYTE MATERIAL AND BATTERY

BACKGROUND

1. Technical Field

The present disclosure relates to a solid electrolyte material and a battery.

2. Description of the Related Art

Japanese Unexamined Patent Application Publication No. 2011-129312 discloses an all-solid battery using a sulfide solid electrolyte.

Japanese Unexamined Patent Application Publication No. 2006-244734 discloses an all-solid battery using a halide containing indium as a solid electrolyte.

SUMMARY

In known technologies, it is desired to realize a solid electrolyte material having a high lithium ion conductivity.

In one general aspect, the techniques disclosed here feature a solid electrolyte material represented by the following Compositional Formula (1):

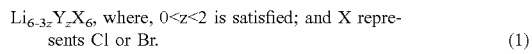

$Li_{6-3z}Y_zX_6$, where, $0<z<2$ is satisfied; and X represents Cl or Br. (1)

According to the present disclosure, a solid electrolyte material having a high lithium ion conductivity can be achieved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure will now be described with reference to the drawings.

Embodiment 1

The solid electrolyte material in Embodiment 1 is a compound represented by the following Compositional Formula (2):

$Li_3YX_6$ (2)

where, X represents Cl (chlorine) or Br (bromine).

According to the structure mentioned above, a solid electrolyte material (halide solid electrolytic material) having a high lithium ion conductivity can be achieved. In addition, a solid electrolyte material having a structure stable in an assumed operation temperature range (e.g., a range of −30° C. to 80° C.) of a battery can be achieved. That is, the solid electrolyte material of Embodiment 1 does not have a structure (e.g., the structure in Japanese Unexamined Patent Application Publication No. 2006-244734) in which the phase transition temperature is present within the operation temperature range of the battery. Consequently, even in an environment with temperature change, phase transition does not occur in the operation temperature range of the battery, and a high ionic conductivity can be stably maintained.

According to the structure described above, an all-solid-state secondary battery having excellent charge and discharge characteristics can be achieved by using the solid electrolyte material of Embodiment 1. In addition, an all-solid-state secondary battery not containing sulfur can be achieved by using the solid electrolyte material of Embodiment 1. That is, the solid electrolyte material of Embodiment 1 does not have a structure (e.g., the structure in Japanese Unexamined Patent Application Publication No. 2011-129312) generating hydrogen sulfide when exposed to the atmosphere. Accordingly, an all-solid-state secondary battery not generating hydrogen sulfide and having excellent safety can be achieved.

The solid electrolyte material in Embodiment 1 may include a crystal phase. Examples of the crystal phase include a first crystal phase and a second crystal phase described below.

That is, the solid electrolyte material in Embodiment 1 may include a first crystal phase.

In the first crystal phase, the arrangement of halogen X is the same as that of Br in $Li_3ErBr_6$ (hereinafter, also expressed as LEB) having a crystal structure belonging to space group C2/m.

According to the structure described above, a solid electrolyte material having a higher lithium ion conductivity can be achieved. Specifically, a crystal structure like the first crystal phase allows X to be more strongly attracted to the periphery of Y. Consequently, a path through which lithium ions diffuse is formed. Accordingly, the lithium ion conductivity is further improved.

Figure 2:
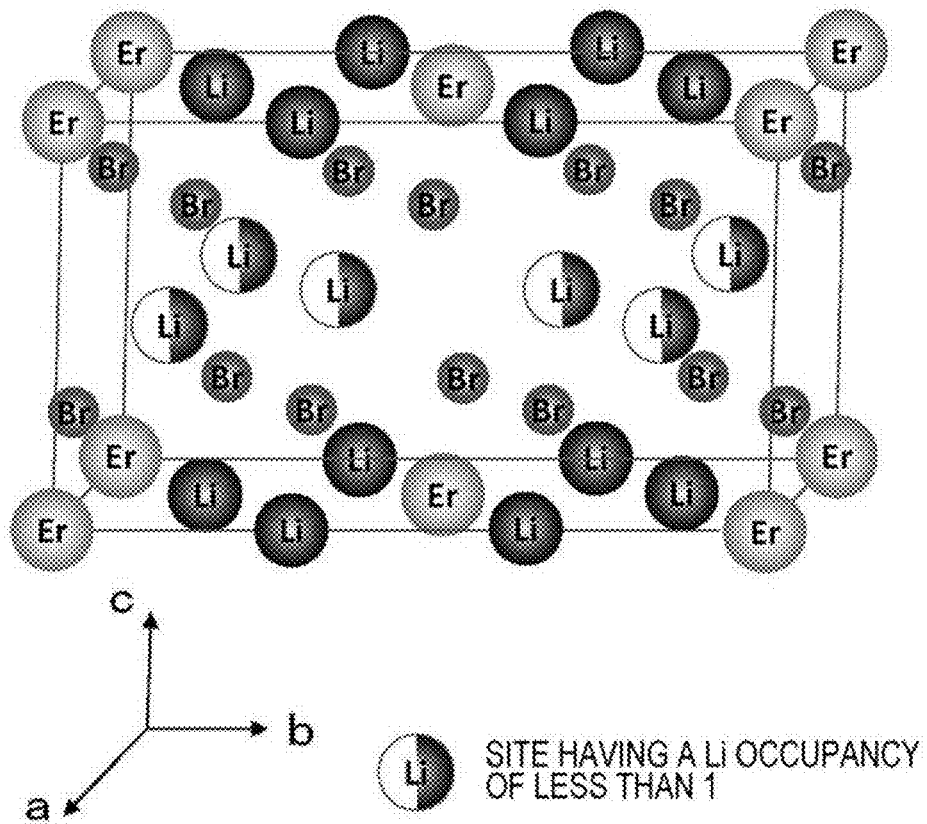
FIG. 2 is a perspective view illustrating the crystal structure of a $Li_3ErBr_6$ structure.

FIG. 2 is a perspective view illustrating the crystal structure of a $Li_3ErBr_6$ structure.

As shown in FIG. 2, the $Li_3ErBr_6$ structure (LEB structure) has monoclinic symmetry and is a crystal structure belonging to space group C2/m. The details of the atomic arrangement are available in the inorganic crystal structure database (ICSD).

The first crystal phase having the same halogen arrangement as that of the LEB structure includes, in a unit cell, two of the same compositions represented by Compositional Formula (2).

The lattice constants of the unit cell defined by the LEB structure are a=6.9 to 7.6 angstrom, b=11.9 to 13.1 angstrom, c=6.8 to 7.5 angstrom, α=90°, β=109°, and γ=90°.

The LEB structure can be identified by structural analysis using X-ray diffractometry. When the measurement is performed by a θ-2θ method using Cu—Kα rays (wavelength: 1.5405 angstrom and 1.5444 angstrom) as the X-ray, strong peaks are observed within the ranges of diffraction angle 2θ values of 25° to 28°, 29° to 32°, 41° to 46°, 49° to 55°, and 51° to 58°.

The solid electrolyte material in Embodiment 1 may satisfy $I_{LEB(110)}/I_{LEB(200)}<0.01$.

Herein, $I_{LEB(200)}$ represents the X-ray diffraction intensity of a first crystal phase plane corresponding to the (200) plane in the crystal structure of $Li_3ErBr_6$.

$I_{LEB(110)}$ represents the X-ray diffraction intensity of a first crystal phase plane corresponding to the (110) plane in the crystal structure of $Li_3ErBr_6$.

According to the structure described above, a solid electrolyte material having a higher lithium ion conductivity can be achieved. Specifically, irregular arrangement of Y can be achieved. Consequently, the conduction path of lithium ions is three-dimensionally connected. Accordingly, the lithium ion conductivity is further improved.

As described above, the arrangement of cations of the solid electrolyte material in Embodiment 1 need not be the same as the arrangement of cations in the LEB structure. That is, at least part of Y (yttrium) and at least part of Li may be irregularly arranged.

The irregularity of the arrangement of cations can be evaluated by the above-mentioned intensity ratio "$I_{LEB(110)}/I_{LEB(200)}$" in the XRD pattern.

When the arrangement of Y is regular, $I_{LEB(110)}/I_{LEB(200)}$=about 0.02 (about 2%). The value of $I_{LEB(110)}/I_{LEB(200)}$ decreases with an increase in irregularity. As described above, if $I_{LEB(110)}/I_{LEB(200)}<0.01$ (1%), sufficiently irregular arrangement of Y can be achieved.

The solid electrolyte material in Embodiment 1 may satisfy $FWHM_1/2\theta c_1 \geq 0.015$.

Herein, $FWHM_1$ represents the full width at half maximum of an X-ray diffraction peak of a first crystal phase plane corresponding to the (200) plane in the crystal structure of $Li_3ErBr_6$.

In the expression, $2\theta c_1$ denotes the diffraction angle at the center of the X-ray diffraction peak (peak central value).

According to the structure described above, a solid electrolyte material having a higher lithium ion conductivity can be achieved. Specifically, a nonuniform lattice constant can be provided. Consequently, a region having a spread in the lattice is formed. Accordingly, the lithium ion conductivity is further improved.

As described above, the lattice constant of the solid electrolyte material in Embodiment 1 need not be completely uniform. That is, the lattice constant may have some nonuniformity. Specifically, the lattice constant distribution may have a full width at half maximum of about 1% or more.

In the solid electrolyte material of Embodiment 1, the structure of the first crystal phase may be distorted, and the atoms may be arranged at slightly different atomic positions.

The solid electrolyte material in Embodiment 1 may include a heterogeneous crystal phase having a crystal structure different from that of the first crystal phase.

In such a case, the heterogeneous crystal phase may lie between the first crystal phases.

According to the structure described above, a solid electrolyte material having a higher lithium ion conductivity can be achieved. Specifically, the conduction of lithium ions between the first crystal phases is enhanced by the heterogeneous crystal phase. Accordingly, the lithium ion conductivity is further improved.

The solid electrolyte material in Embodiment 1 may include an amorphous phase.

In such a case, the amorphous phase may lie between the first crystal phases.

According to the structure described above, a solid electrolyte material having a higher lithium ion conductivity can be achieved. Specifically, the conduction of lithium ions between the first crystal phases is enhanced by the amorphous phase. Accordingly, the lithium ion conductivity is further improved.

The solid electrolyte material in Embodiment 1 may include a second crystal phase.

In the second crystal phase, the arrangement of halogen X is the same as that of Cl in $Li_3ErCl_6$ (hereinafter, also expressed as LEC) having a crystal structure belonging to space group P-3m1.

According to the structure described above, a solid electrolyte material having a higher lithium ion conductivity can be achieved. Specifically, a crystal structure like the second crystal phase allows X to be more strongly attracted to the periphery of Y. Consequently, a path through which lithium ions diffuse is formed. Accordingly, the lithium ion conductivity is further improved.

Figure 3:
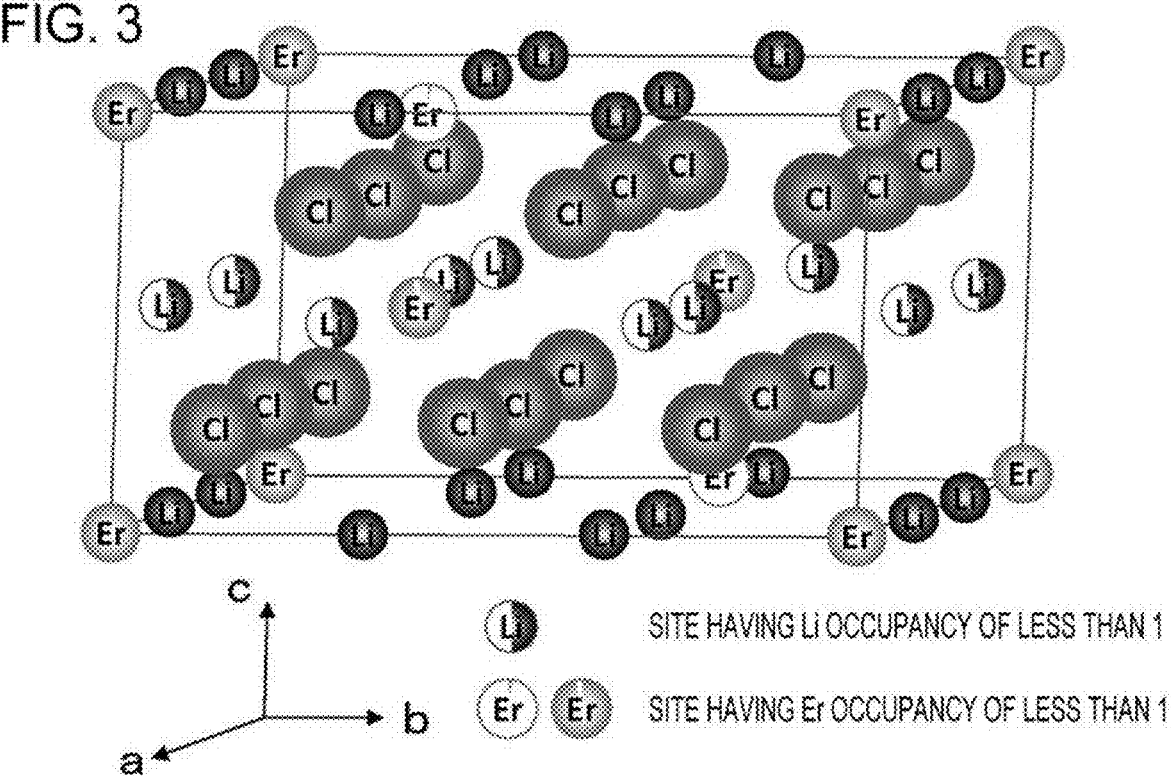
FIG. 3 is a perspective view illustrating the crystal structure of a $Li_3ErCl_6$ structure.

FIG. 3 is a perspective view illustrating the crystal structure of a $Li_3ErCl_6$ structure.

As shown in FIG. 3, the $Li_3ErCl_6$ structure (LEC structure) has trigonal symmetry and is a crystal structure belonging to space group P-3m1. The details of the atomic arrangement are available in the inorganic crystal structure database (ICSD).

The second crystal phase having the same halogen arrangement as that of the LEC structure includes, in a unit cells, three of the same compositions represented by Compositional Formula (2).

The lattice constants of the unit cell defined by the LEC structure are a=10.97 to 11.5 angstrom, b=a, c=5.9 to 6.2 angstrom, α=90°, β=90°, and γ=120°.

The LEC structure can be identified by structural analysis using X-ray diffractometry. When the measurement is performed by a θ-2θ method using Cu—Kα rays (wavelength: 1.5405 angstrom and 1.5444 angstrom) as the X-ray, strong peaks are observed within the ranges of diffraction angle 2θ values of 29.8° to 32°, 38.5° to 41.7°, 46.3° to 50.4°, and 50.8° to 55.4°.

The solid electrolyte material in Embodiment 1 may satisfy $I_{LEC(110)}/I_{LEC(301)}<0.3$.

Herein, $I_{LEC(301)}$ is the X-ray diffraction intensity of a second crystal phase plane corresponding to the (301) plane in the crystal structure of $Li_3ErCl_6$.

$I_{LEC(110)}$ is the X-ray diffraction intensity of a second crystal phase plane corresponding to the (110) plane of the crystal structure of $Li_3ErCl_6$.

According to the structure described above, a solid electrolyte material having a higher lithium ion conductivity can be achieved. Specifically, irregular arrangement of Y can be achieved. Consequently, the conduction path of lithium ions is three-dimensionally connected. Accordingly, the lithium ion conductivity is further improved.

As described above, the arrangement of cations of the solid electrolyte material in Embodiment 1 need not be the same as the arrangement of cations of the LEC structure. That is, at least part of Y and at least part of Li may be irregularly arranged.

The irregularity of the arrangement of cations can be evaluated by the above-mentioned intensity ratio "$I_{LEC(110)}/I_{LEC(301)}$" in the XRD pattern.

When the arrangement of Y is regular, $I_{LEC(110)}/I_{LEC(301)} \geq$ about 0.45 (about 45%). The value of $I_{LEC(110)}/I_{LEC(301)}$ decreases with an increase in irregularity. As described above, if $I_{LEC(110)}/I_{LEC(301)} < 0.30$ (30%), sufficiently irregular arrangement of Y can be achieved.

The solid electrolyte material in Embodiment 1 may satisfy $FWHM_2/2\theta c_2 \geq 0.015$.

Herein, $FWHM_2$ represents the full width at half maximum of an X-ray diffraction peak of a second crystal phase plane corresponding to the (301) plane in the crystal structure of $Li_3ErCl_6$.

In the expression, $2\theta c_2$ denotes the diffraction angle at the center of the X-ray diffraction peak (peak central value).

According to the structure described above, a solid electrolyte material having a higher lithium ion conductivity can be achieved. Specifically, a nonuniform lattice constant can be provided. Consequently, a region having a lattice spread is formed. Accordingly, the lithium ion conductivity is further improved.

As described above, the lattice constant of the solid electrolyte material in Embodiment 1 need not be completely uniform. That is, the lattice constant may have some nonuniformity. Specifically, the lattice constant distribution may have a full width at half maximum of about 1% or more.

In the solid electrolyte material of Embodiment 1, the structure of the second crystal phase may be distorted, and the atoms may be arranged at slightly different atomic positions.

The solid electrolyte material in Embodiment 1 may include a heterogeneous crystal phase having a crystal structure different from that of the second crystal phase.

In such a case, the heterogeneous crystal phase may lie between the second crystal phases.

According to the structure described above, a solid electrolyte material having a higher lithium ion conductivity can be achieved. Specifically, the conduction of lithium ions between the second crystal phases is enhanced by the heterogeneous crystal phase. Accordingly, the lithium ion conductivity is further improved.

The solid electrolyte material in Embodiment 1 may include an amorphous phase.

In such a case, the second crystal phase may lie between the second crystal phases.

According to the structure described above, a solid electrolyte material having a higher lithium ion conductivity can be achieved. Specifically, the conduction of lithium ions between the second crystal phases is enhanced by the amorphous phase. Accordingly, the lithium ion conductivity is further improved.

The solid electrolyte material in Embodiment 1 may have any shape, such as an acicular, spherical, or oval spherical shape. For example, the solid electrolyte material in Embodiment 1 may be in a particle form. A plurality of the particles may be laminated and then formed into a pellet or plate by pressurization.

For example, when the solid electrolyte material in Embodiment 1 is in a particle (e.g., spherical) form, the median diameter may be 0.1 μm or more and 100 μm or less.

In Embodiment 1, the median diameter may be 0.5 μm or more and 10 μm or less.

According to the structure described above, the ionic conductivity can be further increased. In addition, a more satisfactory dispersion state of the solid electrolyte material of Embodiment 1 and an active material or the like can be formed.

In Embodiment 1, the solid electrolyte material may have a median diameter smaller than that of the active material.

According to the structure described above, a more satisfactory dispersion state of the solid electrolyte material of Embodiment 1 and an active material or the like can be formed.

Method for Producing Solid Electrolyte Material

The solid electrolyte material in Embodiment 1 can be produced by, for example, the following method.

Raw material powders of binary halides are prepared at a blending ratio giving a target composition. For example, in the case of producing $Li_3YCl_6$, LiCl and $YCl_3$ are prepared at a molar ratio of 3:1.

In such a case, X in Compositional Formula (2) can be determined by selecting the types of the raw material powders. The raw material powders are sufficiently mixed and are then mixed, pulverized, and reacted with each other using a mechanochemical milling process. Alternatively, the raw material powders are sufficiently mixed and may be then sintered in vacuum.

Consequently, a solid electrolyte material having a crystal phase described above is given.

The structure of the crystal phase (crystal structure) of the solid electrolyte material can be determined by adjusting the reaction method and reaction conditions for the raw material powders.

Embodiment 2

Embodiment 2 will now be described. The description overlapping with Embodiment 1 described above is omitted as appropriate.

The solid electrolyte material in Embodiment 2 is a compound represented by Compositional Formula (1):

where, $0 < z < 2$ is satisfied; and X represents Cl or Br.

According to the structure mentioned above, a solid electrolyte material (halide solid electrolytic material) having a high lithium ion conductivity can be achieved. In addition, a solid electrolyte material having a structure being stable in the assumed operation temperature range (e.g., a range of −30° C. to 80° C.) of the battery can be achieved. That is, the solid electrolyte material of Embodiment 2 does not have a structure (e.g., the structure in Japanese Unexamined Patent Application Publication No. 2006-244734) in which the phase transition temperature is present within the operation temperature range of the battery. Consequently, even in an environment with temperature change, phase transition does not occur in the operation temperature range of the battery, and a high ionic conductivity can be stably maintained.

According to the structure described above, an all-solid-state secondary battery having excellent charge and discharge characteristics can be achieved by using the solid electrolyte material of Embodiment 2. In addition, an all-solid-state secondary battery not containing sulfur can be achieved by using the solid electrolyte material Embodiment 2. That is, the solid electrolyte material of Embodiment 2 does not have a structure (e.g., the structure in Japanese Unexamined Patent Application Publication No. 2011-129312) generating hydrogen sulfide when exposed to the atmosphere. Accordingly, an all-solid-state secondary battery not generating hydrogen sulfide and having excellent safety can be achieved.

The solid electrolyte material in Embodiment 2 satisfies $0.75 \leq z \leq 1.5$.

According to the structure described above, a solid electrolyte material (halide solid electrolytic material) having a higher lithium ion conductivity can be achieved. In addition, an all-solid-state secondary battery having more excellent charge and discharge characteristics can be achieved.

The solid electrolyte material in Embodiment 2 satisfies $1 \leq z \leq 1.25$.

According to the structure described above, a solid electrolyte material (halide solid electrolytic material) having a higher lithium ion conductivity can be achieved. In addition, an all-solid-state secondary battery having more excellent charge and discharge characteristics can be achieved.

The solid electrolyte material in Embodiment 2 may include a crystal phase. Examples of the crystal phase include a first crystal phase and a third crystal phase described below.

That is, the solid electrolyte material in Embodiment 2 may include a first crystal phase.

In the first crystal phase, the arrangement of halogen X is the same as that of Br in $Li_3ErBr_6$ (hereinafter, also expressed as LEB) having a crystal structure belonging to space group C2/m.

According to the structure described above, a solid electrolyte material having a higher lithium ion conductivity can be achieved. Specifically, a crystal structure like the first crystal phase allows X to be more strongly attracted to the periphery of Y. Consequently, a path through which lithium ions diffuse is formed. Accordingly, the lithium ion conductivity is further improved.

As shown in FIG. 2, the $Li_3ErBr_6$ structure (LEB structure) has monoclinic symmetry and is a crystal structure belonging to space group C2/m. The details of the atomic arrangement are available in the inorganic crystal structure database (ICSD).

The first crystal phase having the same halogen arrangement as that of the LEB structure includes, in a unit cell, two of the same composition represented by Compositional Formula (1).

The lattice constants of the unit cell defined by the LEB structure are a=6.9 to 7.6 angstrom, b=11.9 to 13.1 angstrom, c=6.8 to 7.5 angstrom, $\alpha=90°$, $\beta=109°$, and $\gamma=90°$.

The LEB structure can be identified by structural analysis using X-ray diffractometry. When the measurement is performed by a θ-2θ method using Cu—Kα rays (wavelength: 1.5405 angstrom and 1.5444 angstrom) as the X-ray, strong peaks are observed within the ranges of diffraction angle 2θ values of 25° to 28°, 29° to 33, 41° to 47°, 49° to 55°, and 51° to 58°.

The solid electrolyte material in Embodiment 2 may satisfy $I_{LEB(110)}/I_{LEB(200)} < 0.01$.

Herein, $I_{LEB(200)}$ represents the X-ray diffraction intensity of a first crystal phase plane corresponding to the (200) plane in the crystal structure of $Li_3ErBr_6$.

$I_{LEB(110)}$ represents the X-ray diffraction intensity of a first crystal phase plane corresponding to the (110) plane in the crystal structure of $Li_3ErBr_6$.

According to the structure described above, a solid electrolyte material having a higher lithium ion conductivity can be achieved. Specifically, irregular arrangement of Y can be achieved. Consequently, the conduction path of lithium ions is three-dimensionally connected. Accordingly, the lithium ion conductivity is further improved.

As described above, the arrangement of cations of the solid electrolyte material in Embodiment 2 need not be the same as the arrangement of cations of the LEB structure. That is, at least part of Y and at least part of Li may be irregularly arranged.

The irregularity of the arrangement of cations can be evaluated by the above-mentioned intensity ratio "$I_{LEB(110)}/I_{LEB(200)}$" in the XRD pattern.

When the arrangement of Y is regular, $I_{LEB(110)}/I_{LEB(200)}$=about 0.02 (about 2%). The value of $I_{LEB(110)}/I_{LEB(200)}$ decreases with an increase in irregularity. As described above, if $I_{LEB(110)}/I_{LEB(200)} < 0.01$ (1%), sufficiently irregular arrangement of Y can be achieved.

The solid electrolyte material in Embodiment 2 may satisfy $FWHM_1/2\theta c_1 \geq 0.015$.

Herein, $FWHM_1$ represents the full width at half maximum of an X-ray diffraction peak of a first crystal phase plane corresponding to the (200) plane in the crystal structure of $Li_3ErBr_6$.

In the expression, $2\theta c_1$ denotes the diffraction angle at the center of the X-ray diffraction peak (peak central value).

According to the structure described above, a solid electrolyte material having a higher lithium ion conductivity can be achieved. Specifically, a nonuniform lattice constant can be provided. Consequently, a region having a lattice spread is formed. Accordingly, the lithium ion conductivity is further improved.

As described above, the lattice constant of the solid electrolyte material in Embodiment 2 need not be completely uniform. That is, the lattice constant may have some nonuniformity. Specifically, the lattice constant distribution may have a full width at half maximum of about 1% or more.

In the solid electrolyte material of Embodiment 2, the structure of the first crystal phase may be distorted, and the atoms may be arranged at slightly different atomic positions.

The solid electrolyte material in Embodiment 2 may include a heterogeneous crystal phase having a crystal structure different from that of the first crystal phase.

In such a case, the heterogeneous crystal phase may lie between the first crystal phases.

According to the structure described above, a solid electrolyte material having a higher lithium ion conductivity can be achieved. Specifically, the conduction of lithium ions between the first crystal phases is enhanced by the heterogeneous crystal phase. Accordingly, the lithium ion conductivity is further improved.

The solid electrolyte material in Embodiment 2 may include an amorphous phase.

In such a case, the amorphous phase may lie between the first crystal phases.

According to the structure described above, a solid electrolyte material having a higher lithium ion conductivity can be achieved. Specifically, the conduction of lithium ions between the first crystal phases is enhanced by the amorphous phase. Accordingly, the lithium ion conductivity is further improved.

The solid electrolyte material in Embodiment 2 may include a third crystal phase.

In the third crystal phase, the arrangement of halogen X is the same as that of Cl in $Li_3YbCl_6$ (hereinafter, also expressed as LYC) having a crystal structure belonging to space group Pnma.

According to the structure described above, a solid electrolyte material having a higher lithium ion conductivity can be achieved. Specifically, a crystal structure like the third crystal phase allows X to be more strongly attracted to the periphery of Y. Consequently, a path through which lithium ions diffuse is formed. Accordingly, the lithium ion conductivity is further improved.

Figure 8:
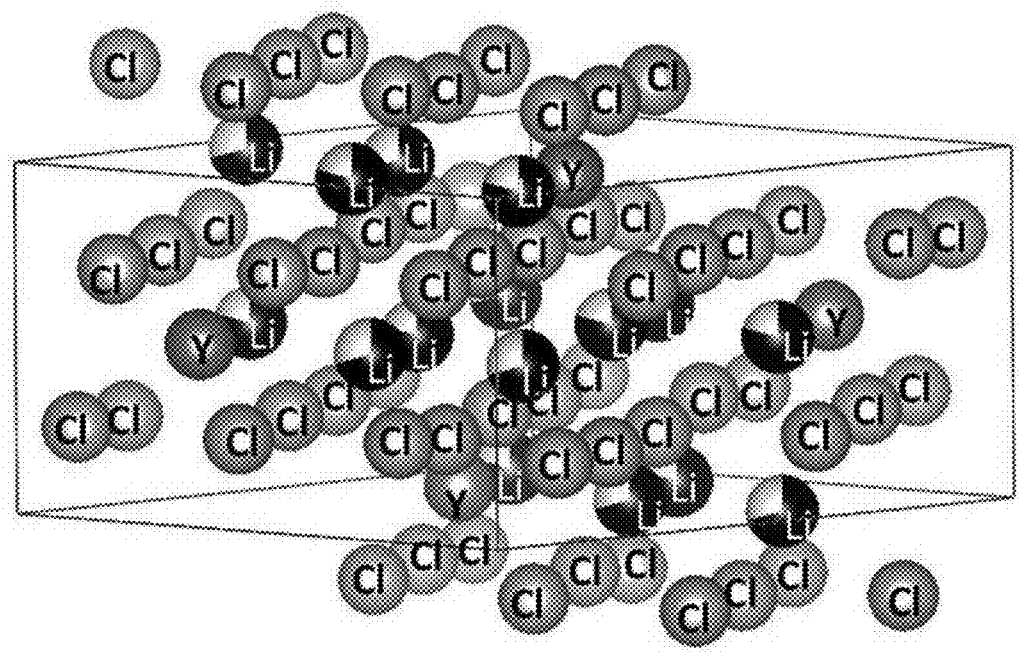
FIG. 8 is a perspective view illustrating the crystal structure of a $Li_3YbCl_6$ structure.
Figure 8:
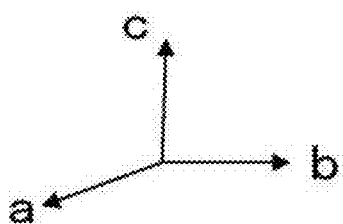
Figure 8:

FIG. 8 is a perspective view illustrating the crystal structure of a $Li_3YbCl_6$ structure.

As shown in FIG. 8, the $Li_3YbCl_6$ structure (LYC structure) has orthorhombic symmetry and is a crystal structure belonging to space group Pnma. The details of the atomic arrangement are available in the inorganic crystal structure database (ICSD).

The third crystal phase having the same halogen arrangement as that of the LYC structure includes, in a unit cell, three of the same compositions represented by Compositional Formula (1).

The lattice constants of the unit cell defined by the LYC structure are a=12.8 to 13.5 angstrom, b=11.1 to 12.0 angstrom, and c=5.90 to 6.10 angstrom.

The LYC structure can be identified by structural analysis using X-ray diffractometry. When the measurement is performed by a θ-2θ method using Cu—Kα rays (wavelength: 1.5405 angstrom and 1.5444 angstrom) as the X-ray, strong peaks are observed within the ranges of diffraction angle 2θ values of 29.8° to 32°, 38.5° to 41.7°, 46.3° to 50.4°, and 50.8° to 55.4°.

The solid electrolyte material in Embodiment 2 may satisfy $FWHM_3/2\theta c_3 \geq 0.015$.

Herein, $FWHM_3$ represents the full width at half maximum of an X-ray diffraction peak of a third crystal phase plane corresponding to the (231) plane in the crystal structure of $Li_3YbCl_6$.

In the expression, $2\theta c_3$ denotes the diffraction angle at the center of the X-ray diffraction peak (peak central value).

According to the structure described above, a solid electrolyte material having a higher lithium ion conductivity can be achieved. Specifically, a nonuniform lattice constant can be provided. Consequently, a region having a lattice spread is formed. Accordingly, the lithium ion conductivity is further improved.

As described above, the lattice constant of the solid electrolyte material in Embodiment 2 need not be completely uniform. That is, the lattice constant may have some nonuniformity. Specifically, the lattice constant distribution may have a full width at half maximum of about 1% or more.

In the solid electrolyte material of Embodiment 2, the structure of the third crystal phase may be distorted, and the atoms may be arranged at slightly different atomic positions.

The solid electrolyte material in Embodiment 2 may include a heterogeneous crystal phase having a crystal structure different from that of the third crystal phase.

In such a case, the heterogeneous crystal phase may lie between the third crystal phases.

According to the structure described above, a solid electrolyte material having a higher lithium ion conductivity can be achieved. Specifically, the conduction of lithium ions between the third crystal phases is enhanced by the heterogeneous crystal phase. Accordingly, the lithium ion conductivity is further improved.

The solid electrolyte material in Embodiment 2 may include an amorphous phase.

In such a case, the amorphous phase may lie between the third crystal phases.

According to the structure described above, a solid electrolyte material having a higher lithium ion conductivity can be achieved. Specifically, the conduction of lithium ions between the third crystal phases is enhanced by the amorphous phase. Accordingly, the lithium ion conductivity is further improved.

The solid electrolyte material in Embodiment 2 may have any shape, such as an acicular, spherical, or oval spherical shape. For example, the solid electrolyte material in Embodiment 2 may be in a particle form. A plurality of the particles may be laminated and then formed into a pellet or plate by pressurization.

For example, when the solid electrolyte material of Embodiment 2 is in a particle (e.g., spherical) form, the median diameter may be 0.1 µm or more and 100 µm or less.

In Embodiment 2, the median diameter may be 0.5 µm or more and 10 µm or less.

According to the structure described above, the ionic conductivity can be further increased. In addition, a more satisfactory dispersion state of the solid electrolyte material of Embodiment 2 and an active material or the like can be formed.

In Embodiment 2, the solid electrolyte material may have a median diameter smaller than that of the active material.

According to the structure described above, a more satisfactory dispersion state of the solid electrolyte material of Embodiment 2 and an active material or the like can be formed.

Method for Producing Solid Electrolyte Material

The solid electrolyte material in Embodiment 2 can be produced by, for example, the following method.

Raw material powders of binary halides are prepared at a blending ratio giving a target composition. For example, in the case of producing $Li_3YCl_6$, LiCl and $YCl_3$ are prepared at a molar ratio of 3:1.

In such a case, X in Compositional Formula (1) can be determined by selecting the types of the raw material powders. In addition, the value of "z" in Compositional Formula (1) can be adjusted by adjusting the mixing ratio of the raw material powder including Y.

The raw material powders are sufficiently mixed and are then mixed, pulverized, and reacted with each other using a mechanochemical milling process. Alternatively, the raw material powders may be sufficiently mixed and then sintered in vacuum or in an inert atmosphere (for example, in an argon atmosphere or nitrogen atmosphere).

Consequently, a solid electrolyte material having a crystal phase described above is given.

The structure of the crystal phase (crystal structure) of a solid electrolyte material can be determined by adjusting the reaction method and reaction conditions for the raw material powders.

The composition of a solid electrolyte material can be determined by, for example, ICP emission spectroscopy, an inert gas melting-infrared absorption method, or an electron probe micro analyzer (EPMA) method.

Embodiment 3

Embodiment 3 will now be described. The description overlapping with Embodiment 1 or 2 described above is omitted as appropriate.

The solid electrolyte material in Embodiment 3 is a compound represented by Compositional Formula (1):

where 0<z<2 is satisfied; and X represents Cl or Br.

The solid electrolyte material in Embodiment 3 may include a crystal phase. Examples of the crystal phase include a fourth crystal phase and a fifth crystal phase described below.

That is, the solid electrolyte material in Embodiment 3 may include a fourth crystal phase.

In the fourth crystal phase, X is Br. In the fourth crystal phase, when the structural analysis using X-ray diffractometry is performed by a θ-2θ method using Cu—Kα rays (wavelength: 1.5405 angstrom and 1.5444 angstrom) as the X-ray, peaks are observed within the ranges of diffraction angle 2θ values of 13.1° to 14.5°, 26.6° to 28.3°, 30.8° to 32.7°, 44.2° to 47.1°, 52.3° to 55.8°, and 54.8° to 58.5°.

According to the structure described above, a solid electrolyte material having a higher lithium ion conductivity can be achieved. Specifically, it is conceivable that the ionic conductivity is improved by the following effect. That is, a crystal structure like the fourth crystal phase allows Br to be more strongly attracted to the periphery of Y. Consequently, a path through which lithium ions diffuse is formed. Accordingly, the lithium ion conductivity is further improved.

The solid electrolyte material in Embodiment 3 may satisfy $FWHM_4/2\,\theta c_4 \geq 0.015$.

Herein, $FWHM_4$ represents the full width at half maximum of an X-ray diffraction peak observed within the range of 26.6° to 28.3°.

In the expression, $2\,\theta c_4$ denotes the diffraction angle at the center of the X-ray diffraction peak (peak central value).

According to the structure described above, a solid electrolyte material having a higher lithium ion conductivity can be achieved. Specifically, it is conceivable that the ionic conductivity is improved by the following effect. That is, the structure mentioned above can provide a nonuniform lattice constant. Consequently, a region having a lattice spread is formed. Accordingly, the lithium ion conductivity is further improved.

The solid electrolyte material in Embodiment 3 may satisfy $I_2/I_1 < 0.1$, more preferably $I_2/I_1 < 0.01$.

Herein, $I_1$ represents the intensity of the diffraction peak appearing within the range of 26.6° to 28.3°.

$I_2$ represents the intensity of the diffraction peak within a range of 15.0° to 16.0°. If no peak was observed in this range, $I_2 = 0$.

According to the structure described above, a solid electrolyte material having a higher lithium ion conductivity can be achieved. Specifically, it is conceivable that the ionic conductivity is improved by the following effect. That is, the structure described above can provide irregular arrangement of Y. Consequently, the conduction path of lithium ions is three-dimensionally connected. Accordingly, the lithium ion conductivity is further improved.

The solid electrolyte material in Embodiment 3 may include a heterogeneous crystal phase having a crystal structure different from that of the fourth crystal phase.

In such a case, the heterogeneous crystal phase may lie between the fourth crystal phases.

According to the structure described above, a solid electrolyte material having a higher lithium ion conductivity can be achieved. Specifically, it is conceivable that the ionic conductivity is improved by the following effect. That is, the conduction of lithium ions between the fourth crystal phases is enhanced by the heterogeneous crystal phase. Accordingly, the lithium ion conductivity is further improved.

The solid electrolyte material in Embodiment 3 may include an amorphous phase.

In such a case, the amorphous phase may lie between the fourth crystal phases.

According to the structure described above, a solid electrolyte material having a higher lithium ion conductivity can be achieved. Specifically, it is conceivable that the ionic conductivity is improved by the following effect. That is, the conduction of lithium ions between the fourth crystal phases is enhanced by the amorphous phase. Accordingly, the lithium ion conductivity is further improved.

In a fifth crystal phase, X is Cl. In the fifth crystal phase, when the structural analysis using X-ray diffractometry is performed by a θ-2θ method using Cu—Kα rays (wavelength: 1.5405 angstrom and 1.5444 angstrom) as the X-ray, peaks are observed within the ranges of diffraction angle 2θ values of 15.3° to 16.3°, 29.8° to 32°, 38.5° to 41.7°, 46.3° to 50.4°, and 50.8° to 55.4°.

According to the structure described above, a solid electrolyte material having a higher lithium ion conductivity can be achieved. Specifically, it is conceivable that the ionic conductivity is improved by the following effect. That is, a crystal structure like the fifth crystal phase allows Cl to be more strongly attracted to the periphery of Y. Consequently, a path through which lithium ions diffuse is formed. Accordingly, the lithium ion conductivity is further improved.

The solid electrolyte material in Embodiment 3 may satisfy $FWHM_5/2\,\theta c_5 \geq 0.015$.

Herein, $FWHM_5$ represents the full width at half maximum of an X-ray diffraction peak appearing within the range of 29.8° to 32°.

In the expression, $2\,\theta c_5$ denotes the diffraction angle at the center of the X-ray diffraction peak (peak central value).

According to the structure described above, a solid electrolyte material having a higher lithium ion conductivity can be achieved. Specifically, it is conceivable that the ionic conductivity is improved by the following effect. That is, the structure mentioned above can provide a nonuniform lattice constant. Consequently, a region having a lattice spread is formed. Accordingly, the lithium ion conductivity is further improved.

The solid electrolyte material in Embodiment 3 may satisfy $I_4/I_3 < 0.3$.

Herein, $I_3$ represents the intensity of the diffraction peak appearing within the range of 29.8° to 32°.

Herein, $I_4$ represents the intensity of the diffraction peak appearing within the range of 15.3° to 16.3°.

According to the structure described above, a solid electrolyte material having a higher lithium ion conductivity can be achieved. Specifically, it is conceivable that the ionic conductivity is improved by the following effect. That is, the structure described above can provide irregular arrangement of Y. Consequently, the conduction path of lithium ions is three-dimensionally connected. Accordingly, the lithium ion conductivity is further improved.

The solid electrolyte material in Embodiment 3 may include a heterogeneous crystal phase having a crystal structure different from that of the fifth crystal phase.

In such a case, the heterogeneous crystal phase may lie between the fifth crystal phases.

According to the structure described above, a solid electrolyte material having a higher lithium ion conductivity can be achieved. Specifically, it is conceivable that the ionic conductivity is improved by the following effect. That is, the conduction of lithium ions between the fifth crystal phases is enhanced by the heterogeneous crystal phase. Accordingly, the lithium ion conductivity is further improved.

The solid electrolyte material in Embodiment 3 may include an amorphous phase.

In such a case, the amorphous phase may lie between the fifth crystal phases.

According to the structure described above, a solid electrolyte material having a higher lithium ion conductivity can be achieved. Specifically, it is conceivable that the ionic conductivity is improved by the following effect. That is, the conduction of lithium ions between the fifth crystal phases is enhanced by the amorphous phase. Accordingly, the lithium ion conductivity is further improved.

Method for Producing Solid Electrolyte Material

The solid electrolyte material in Embodiment 3 can be produced by, for example, the following method.

Raw material powders of binary halides are prepared at a blending ratio giving a target composition. For example, in the case of producing $Li_3YCl_6$, LiCl and $YCl_3$ are prepared at a molar ratio of 3:1.

In such a case, X in Compositional Formula (1) can be determined by selecting the types of the raw material powders. In addition, the value of "z" in Compositional Formula (1) can be adjusted by adjusting the mixing ratio of the raw material powder including Y.

The raw material powders are sufficiently mixed and are then mixed, pulverized, and reacted with each other using a mechanochemical milling process. Alternatively, the raw material powders may be sufficiently mixed and then sintered in vacuum or in an inert atmosphere (for example, in an argon atmosphere or nitrogen atmosphere).

Consequently, a solid electrolyte material having a crystal phase described above is given.

The structure of the crystal phase of a solid electrolyte material can be determined by X-ray powder diffractometry. The measurement of X-ray powder diffraction of a sample is preferably performed in an inert atmosphere (for example, in an argon atmosphere or nitrogen atmosphere) or in a dry atmosphere with a dew point −30° C. or less.

Embodiment 4

Embodiment 4 will now be described. The description overlapping with any one of Embodiments 1 to 3 described above is omitted as appropriate.

The battery of Embodiment 4 is assembled using the solid electrolyte material described in any of Embodiments 1 to 3.

The battery of Embodiment 4 includes a solid electrolyte material, a positive electrode, a negative electrode, and an electrolyte layer.

The electrolyte layer is disposed between the positive electrode and the negative electrode.

At least one of the electrolyte layer and the negative electrode contains the solid electrolyte material of any one of Embodiments 1 to 3.

According to the structure described above, the charge and discharge characteristics of the battery can be improved.

The battery of Embodiment 4 will now be specifically described.

Figure 1:
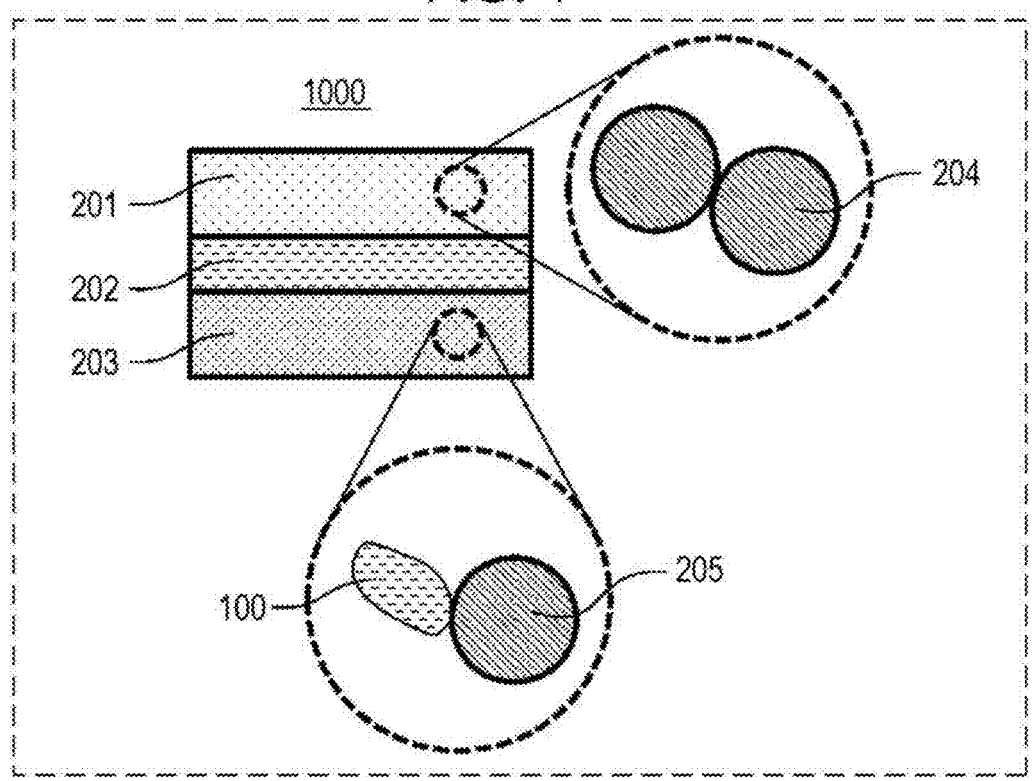
FIG. 1 is a cross-sectional view illustrating a schematic structure of a battery 1000 in Embodiment 4.

FIG. 1 is a cross-sectional view illustrating a schematic structure of a battery 1000 in Embodiment 4.

The battery 1000 of Embodiment 4 includes a positive electrode 201, a negative electrode 203, and an electrolyte layer 202.

The positive electrode 201 includes positive electrode active material particles 204.

The electrolyte layer 202 is disposed between the positive electrode 201 and the negative electrode 203.

The electrolyte layer 202 includes an electrolyte material (for example, solid electrolyte material).

The negative electrode 203 includes negative electrode active material particles 205 and solid electrolyte particles 100.

The solid electrolyte particles 100 are particles consisting of the solid electrolyte material of any one of Embodiments 1 to 3 or particles mainly composed of the solid electrolyte material of any one of Embodiments 1 to 3.

The positive electrode 201 contains a material having properties of occluding and releasing metal ions (for example, lithium ions). The positive electrode 201 includes, for example, a positive electrode active material (for example, positive electrode active material particles 204).

Examples of the positive electrode active material include lithium-containing transition metal oxides (e.g., Li(NiCoAl)$O_2$ and $LiCoO_2$), transition metal fluorides, polyanion and fluorinated polyanion materials, transition metal sulfides, transition metal oxyfluorides, transition metal oxysulfides, and transition metal oxynitrides.

The positive electrode active material particles 204 may have a median diameter of 0.1 µm or more and 100 µm or less. If the median diameter of the positive electrode active material particles 204 is larger than 100 µm, the diffusion of lithium in the positive electrode active material particles 204 slows down. Accordingly, high output operation of the battery may be difficult.

The positive electrode 201 may have a thickness of 10 to 500 µm. If the thickness of the positive electrode is smaller than 10 µm, it may be difficult to ensure a sufficient energy density of the battery. If the thickness of the positive electrode is larger than 500 µm, high output operation may be difficult.

The electrolyte layer 202 includes an electrolyte material. The electrolyte material is, for example, a solid electrolyte material. That is, the electrolyte layer 202 may be a solid electrolyte layer.

The solid electrolyte layer may be constituted of only the solid electrolyte material of any one of Embodiments 1 to 3.

Alternatively, the solid electrolyte layer may be constituted of only a solid electrolyte material different from the solid electrolyte material of any one of Embodiments 1 to 3. Examples of the solid electrolyte material different from the solid electrolyte material of any one of Embodiments 1 to 3 include $Li_2MgX_4$, $Li_2FeX_4$, Li(Al,Ga,In)$X_4$, $Li_3$(Al,Ga,In)$X_6$, and LiI (X: F, Cl, Br, or I).

The solid electrolyte layer may be constituted of both the solid electrolyte material of any one of Embodiments 1 to 3 and the above-mentioned solid electrolyte material different from the solid electrolyte material of any one of Embodiments 1 to 3. In such a case, both materials may be uniformly dispersed. A layer of the solid electrolyte material of any one of Embodiments 1 to 3 and a layer of a solid electrolyte material different from the solid electrolyte material of any one of Embodiments 1 to 3 may be successively arranged in the lamination direction of the battery.

The solid electrolyte layer may have a thickness of 1 µm or more and 100 µm or less. A thickness of the solid electrolyte layer of smaller than 1 µm enhances the risk of short-circuiting between the positive electrode 201 and the negative electrode 203. In contrast, if the thickness of the solid electrolyte layer is larger than 100 µm, high output operation may be difficult.

The negative electrode 203 contains a material having properties of occluding and releasing metal ions (e.g., lithium ions). The negative electrode 203 includes, for example, a negative electrode active material (e.g., negative electrode active material particles 205).

Examples of the negative electrode active material include metal materials, carbon materials, oxides, nitrides, tin compounds, and silicon compounds. The metal material may be a simple metal substance. Alternatively, the metal material may be an alloy. Examples of the metal material include lithium metal and lithium alloys. Examples of the carbon material include natural graphite, coke, carbon during graphitization, carbon fibers, spherical carbon, artificial graphite, and amorphous carbon. From the viewpoint of capacity density, silicon (Si), tin (Sn), silicon compounds, and tin compounds can be preferably used. In the case of using a negative electrode active material having a low average reaction voltage, the electrolysis-suppressing effect of the solid electrolyte material of any one of Embodiments 1 to 3 is further highly exhibited.

The negative electrode active material particles 205 may have a median diameter of 0.1 μm or more and 100 μm or less. If the median diameter of the negative electrode active material particles 205 is smaller than 0.1 μm, a risk of failing to form a satisfactory dispersion state of the negative electrode active material particles 205 and the solid electrolyte particles 100 in the negative electrode is caused. Consequently, the charge and discharge characteristics are deteriorated. In contrast, if the median diameter of the negative electrode active material particles 205 is larger than 100 μm, the diffusion of lithium in the negative electrode active material particles 205 slows down. Accordingly, high output operation of the battery may be difficult.

The negative electrode active material particles 205 may have a median diameter larger than that of the solid electrolyte particles 100. In such a case, a satisfactory dispersion state of the negative electrode active material particles 205 and a halide solid electrolyte material can be formed.

Regarding the volume ratio between the negative electrode active material particles 205 and the solid electrolyte particles 100, "v:100-v", contained in the negative electrode 203, the value of v may satisfy $30 \leq v \leq 95$. If the value of v is lower than 30, it may be difficult to ensure a sufficient energy density of the battery. If the value of v is higher than 95, high output operation may be difficult.

The negative electrode 203 may have a thickness of 10 μm or more and 500 μm or less. If the thickness of the negative electrode is smaller than 10 μm, it may be difficult to ensure a sufficient energy density of the battery. If the thickness of the negative electrode is larger than 500 μm, high output operation may be difficult.

At least one of the positive electrode 201, the electrolyte layer 202, and the negative electrode 203 may contain a sulfide solid electrolyte or an oxide solid electrolyte for enhancing the ionic conductivity. Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. Examples of the oxide solid electrolyte include NASICON-type solid electrolytes, such as $LiTi_2(PO_4)_3$ and element substitutes thereof; $(LaLi)TiO_3$ perovskite-type solid electrolytes; LISICON-type solid electrolytes, such as $Li_{14}ZnGe_4O_{16}$, $Li_4SiO_4$, and $LiGeO_4$ and element substitutes thereof; garnet-type solid electrolytes, such as $Li_7La_3Zr_2O_{12}$ and element substitutes thereof; $Li_3N$ and H substitutes thereof; and $Li_3PO_4$ and N substitutes thereof.

At least one of the positive electrode 201, the electrolyte layer 202, and the negative electrode 203 may contain a solid organic polymer electrolyte for enhancing the ionic conductivity. As the solid organic polymer electrolyte, for example, a compound composed of a polymer and a lithium salt can be used. The polymer may have an ethylene oxide structure. The ethylene oxide structure allows to contain a large amount of the lithium salt to further enhance the ionic conductivity. Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. As the lithium salt, one selected from these lithium salts may be used alone. Alternatively, a mixture of two or more selected from these lithium salts may be used as the lithium salt.

At least one of the positive electrode 201, the electrolyte layer 202, and the negative electrode 203 may contain a nonaqueous electrolyte solution, a gel electrolyte, and an ionic liquid for facilitating delivery and receipt of lithium ions and improving the output characteristics of the battery.

The nonaqueous electrolyte solution contains a nonaqueous solvent and a lithium salt dissolved in the nonaqueous solvent. Examples of the nonaqueous solvent include cyclic carbonate solvents, chain carbonate solvents, cyclic ether solvents, chain ether solvents, cyclic ester solvents, chain ester solvents, and fluorine solvents. Examples of the cyclic carbonate solvent include ethylene carbonate, propylene carbonate, and butylene carbonate. Examples of the chain carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the chain ether solvent include 1,2-dimethoxyethane and 1,2-diethoxyethane. Examples of the cyclic ester solvent include γ-butyrolactone. Examples of the chain ester solvent include methyl acetate. Examples of the fluorine solvent include fluoroethylene carbonate, methyl fluoropropionate, fluorobenzene, fluoroethyl methyl carbonate, and fluorodimethylene carbonate. As the nonaqueous solvent, one selected from these nonaqueous solvents may be used alone. Alternatively, a combination of two or more selected from the nonaqueous solvents may be used as the nonaqueous solvent. The nonaqueous electrolyte solution may contain at least one fluorine solvent selected from the group consisting of fluoroethylene carbonate, methyl fluoropropionate, fluorobenzene, fluoroethyl methyl carbonate, and fluorodimethylene carbonate. Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. As the lithium salt, one selected from these lithium salts may be used alone. Alternatively, a mixture of two or more selected from these lithium salts may be used as the lithium salt. The concentration of the lithium salt is, for example, in a range of 0.5 to 2 mol/L.

As the gel electrolyte, a polymer material impregnated with a nonaqueous electrolyte solution can be used. Examples of the polymer material include poly(ethylene oxide), polyacrylonitrile, poly(vinylidene fluoride), poly(methyl methacrylate), and polymers having ethylene oxide bonds.

The cation constituting the ionic liquid may be, for example, an aliphatic chain quaternary salt, such as tetraalkylammonium and tetraalkylphosphonium; an aliphatic cyclic ammonium, such as pyrrolidiniums, morpholiniums, imidazoliniums, tetrahydropyrimidiniums, piperaziniums, and piperidiniums; or a nitrogen-containing aromatic heterocyclic cation, such as pyridiniums and imidazoliums. The anion constituting the ionic liquid may be, for example, $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. The ionic liquid may contain a lithium salt.

At least one of the positive electrode 201, the electrolyte layer 202, and the negative electrode 203 may contain a binder for enhancing the adhesion between the particles. The binder is used for improving the binding properties of the materials constituting the electrodes. Examples of the binder include poly(vinylidene fluoride), polytetrafluoroethylene, polyethylene, polypropylene, aramid resins, polyimide, polyimide, polyamideimide, polyacrylonitrile, poly(acrylic acid), poly(methyl acrylate), poly(ethyl acrylate), poly (hexyl acrylate), poly(methacrylic acid), poly(methyl methacrylate), poly(ethyl methacrylate), poly(hexyl methacrylate), poly(vinyl acetate), polyvinyl pyrrolidone, polyether, polyether sulfone, hexafluoro polypropylene, styrene butadiene rubber, and carboxymethyl cellulose. The binder can be a copolymer of two or more materials selected from tetrafluoroethylene, hexafluoro ethylene, hexafluoropropylene, perfluoroalkyl vinyl ether, vinylidene fluoride, chlorotrifluoroethylene, ethylene, propylene, pentafluoro propylene, fluoromethyl vinyl ether, acrylic acid, and hexadiene. Alternatively, the binder may be a mixture of two or more selected from these binders.

At least one of the positive electrode 201 and the negative electrode 203 may contain a conductive assistant as needed.

The conductive assistant is used for reducing the electrode resistance. Examples of the conductive assistant include graphites, such as natural graphite and artificial graphite; carbon blacks, such as acetylene black and Ketjen black; conductive fibers, such as carbon fibers and metal fibers; metal powders, such as carbon fluoride and aluminum; conductive whiskers, such as zinc oxide and potassium titanate; conductive metal oxides, such as titanium oxide; and conductive polymers, such as polyaniline, polypyrrole, and polythiophene. The use of a carbon conductive assistant as the conductive assistant can reduce the cost.

The battery in Embodiment 4 can be constituted to have any shape, such as a coin-like, cylindrical, rectangular, sheet-like, button-like, flat, or laminar shape.

EXAMPLES

The present disclosure will now be described in detail using examples and comparative examples.

Example A1

Production of Solid Electrolyte Material

Raw material powders, LiBr and YBr$_3$, were weighed at a molar ratio of LiBr:YBr$_3$=3:1 in a dry atmosphere with a dew point of −30° C. or less and were pulverized and mixed in a mortar. Subsequently, the mixture was subjected to milling treatment with a planetary ball mill at 600 rpm for 25 hours.

Consequently, a powder of Li$_3$YBr$_6$ including a crystal phase was prepared as the solid electrolyte material of Example A1.

Evaluation of Ionic Conductivity

Figure 4:
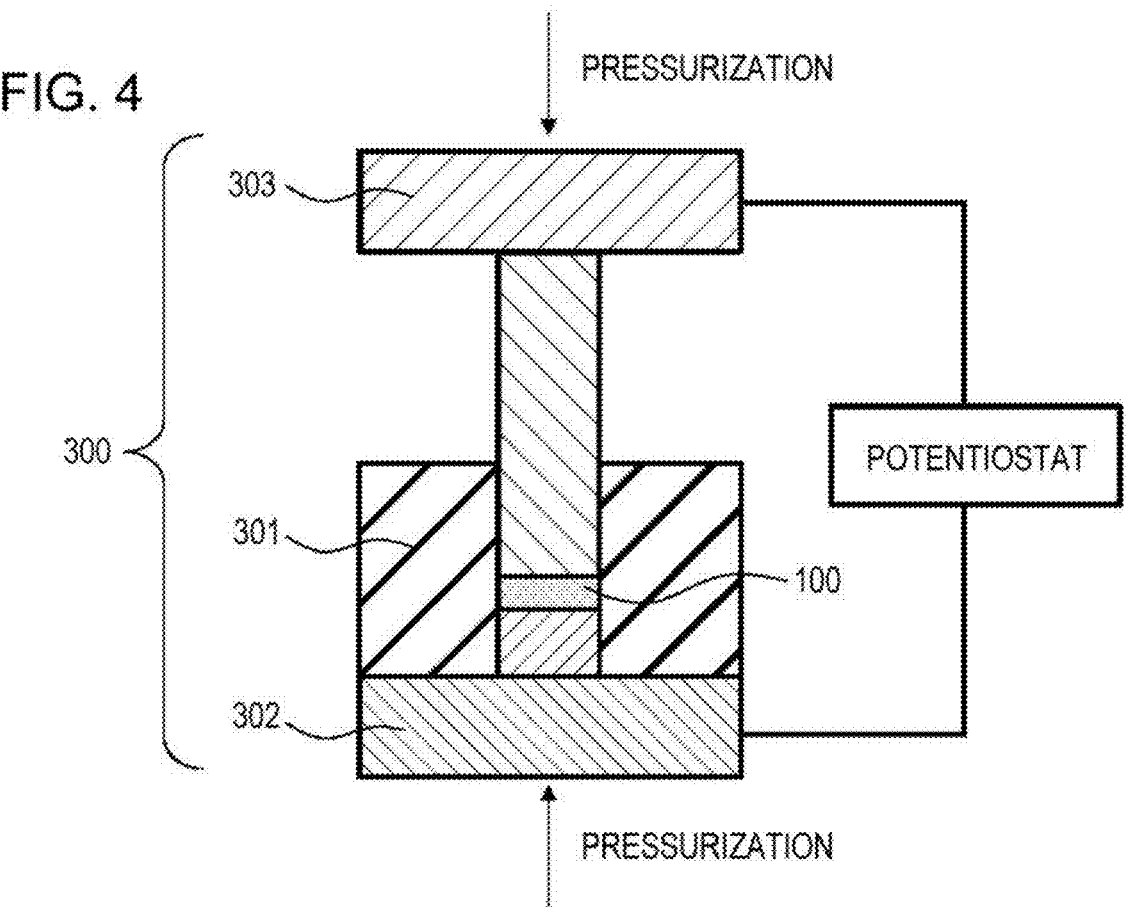
FIG. 4 is a schematic view illustrating a method for evaluating ionic conductivity.

FIG. 4 is a schematic view illustrating a method for evaluating ionic conductivity.

A pressure molding die 300 is constituted of an electronically insulated polycarbonate frame 301 and electron-conductive stainless steel upper punch 303 and lower punch 302.

The ionic conductivity was evaluated using the structure shown in FIG. 4 by the following method.

The powder of the solid electrolyte material of Example 1 was loaded in the pressure molding die 300 in a dry atmosphere with a dew point of −30° C. or less and was uniaxially pressed at 400 MPa to produce a conductivity measurement cell of Example A1.

Under the pressurizing condition, leads were taken from the upper punch 303 and the lower punch 302, respectively, and were connected to a potentiostat (VersaSTAT4, Princeton Applied Research) equipped with a frequency response analyzer, and the ionic conductivity at room temperature was measured by an electrochemical impedance measurement technique.

The solid electrolyte material of Example A1 had an ionic conductivity of $3.0 \times 10^{-4}$ S/cm measured at 22° C.

Evaluation of Phase Transition

Figure 5:
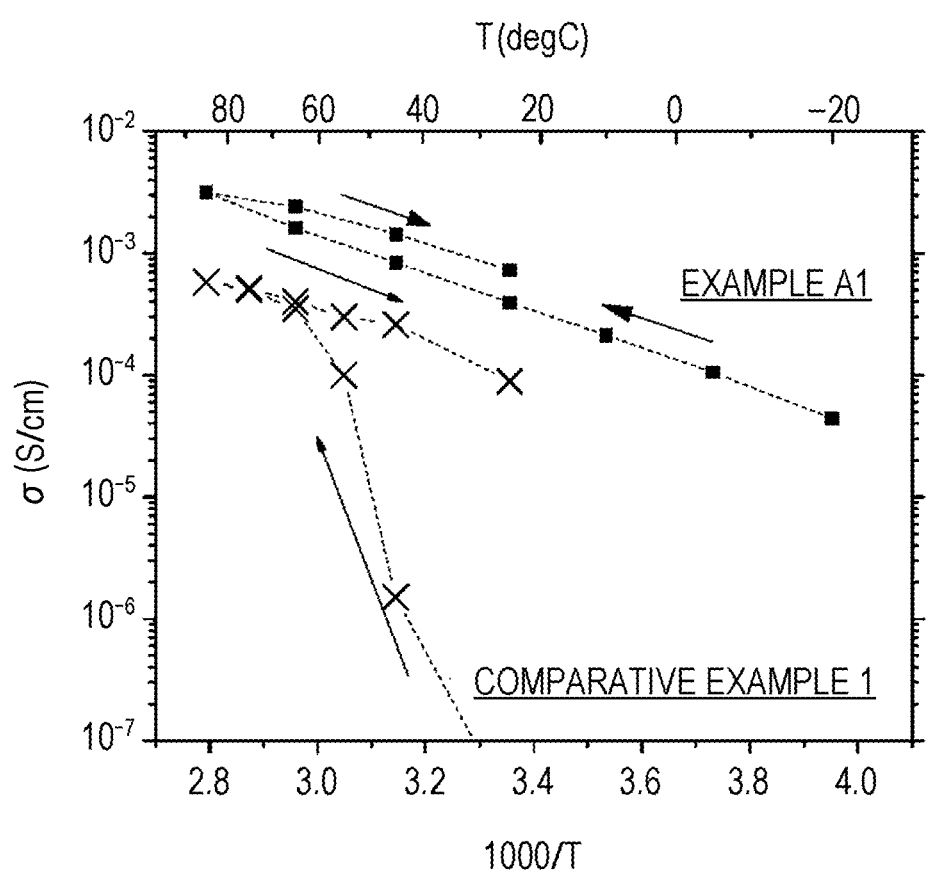
FIG. 5 is a graph showing temperature dependence of the ionic conductivity of solid electrolytes.

FIG. 5 is a graph showing temperature dependence of the ionic conductivity of solid electrolytes.

The results shown in FIG. 5 were obtained through measurement by the following method.

That is, the conductivity measurement cell of Example A1 was placed in a thermostat chamber, and the temperature dependence of conductivity was measured in a temperature-rising process and a temperature-falling process within a range of −30° C. to 80° C.

As shown in FIG. 5, no sharp change in conductivity indicating phase transition was observed.

Analysis of Crystal Structure

Figure 6:
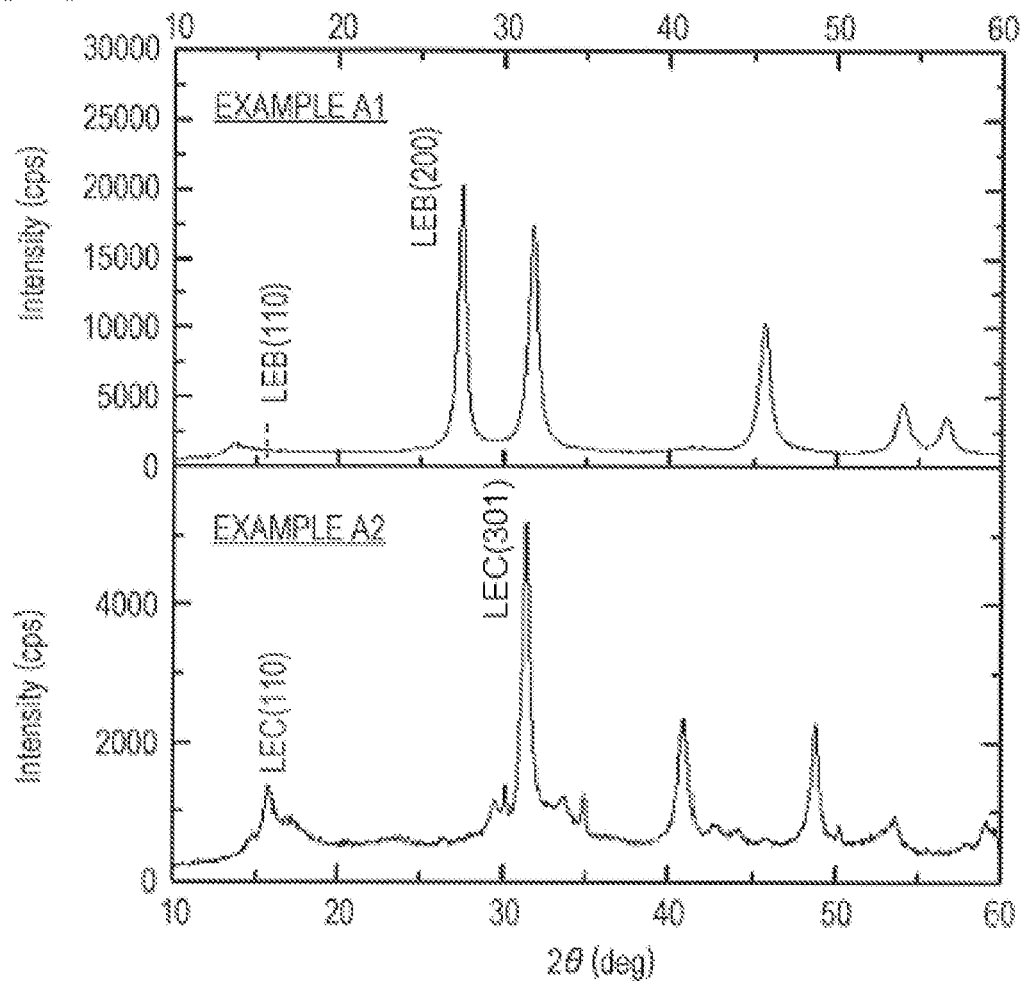
FIG. 6 is a graph showing XRD patterns of solid electrolyte materials.

FIG. 6 is a graph showing XRD patterns of solid electrolyte materials. Peaks were observed at the positions of the 2θ values of 13.7°, 27.4°, 31.7°, 45.5°, 54.0°, and 56.6°.

The results shown in FIG. 6 were obtained through measurement by the following method.

That is, the crystal structure of the solid electrolyte was analyzed by measuring the X-ray diffraction pattern in a dry environment with a dew point of −45° C. or less with an X-ray diffraction apparatus (MiniFlex600, RIGAKU Corporation), using Cu—Kα rays as the X-ray source.

Regarding the solid electrolyte material of Example A1, the resulting X-ray diffraction pattern was analyzed. The results indicated that the X-ray diffraction pattern of the solid electrolyte material of Example A1 corresponded to the X-ray diffraction pattern of a crystal structure having the same anion arrangement as that of an LEB structure when the lattice constants were a=6.93, b=11.96, c=6.84, α=90°, β=109°, and γ=90°.

The rate of the diffraction peak intensity ($I_{LEB(110)}$) corresponding to the (110) plane to the diffraction intensity ($I_{LEB(200)}$) in the vicinity of the diffraction peak corresponding to the LEB structure (200) plane, $I_{LEB(110)}/I_{LEB(200)}$, was less than 1%.

The relationship between the full width at half maximum (FWHM) and the peak central value 2θc of the diffraction peak (2θ=27.4°) corresponding to the LEB structure (200) plane was expressed as FWHM/2 θc=2.3%.

Production of Secondary Battery

The solid electrolyte material Li$_3$YBr$_6$ of Example A1 and an active material LiCoO$_2$ (hereinafter, expressed as LCO) were weighed at a volume ratio of 50:50 in an argon glove box and were mixed in an agate mortar to produce a mixture.

The solid electrolyte material of Example A1 in an amount corresponding to a thickness of 700 μm and 12.3 mg of the mixture described above were stacked in this order in an insulation outer casing. The stacked product was pressure-molded at a pressure of 360 MPa to obtain a first electrode and a solid electrolyte layer.

Subsequently, a metal In (thickness: 200 μm) was stacked on the solid electrolyte layer on the side opposite to the side being in contact with the first electrode. The stacked product was pressure-molded at a pressure of 80 MPa to produce a laminate composed of the first electrode, the solid electrolyte layer, and a second electrode.

Subsequently, stainless steel current collectors were placed on the top and bottom of the laminate, and a collector lead was attached to each of the current collectors.

Finally, the inside of the insulation outer casing was blocked and sealed from the outside atmosphere by insulation ferrules.

Consequently, a secondary battery of Example A1 was produced. Charge and discharge test FIG. 7 is a graph showing initial discharge characteristics.

Figure 7:
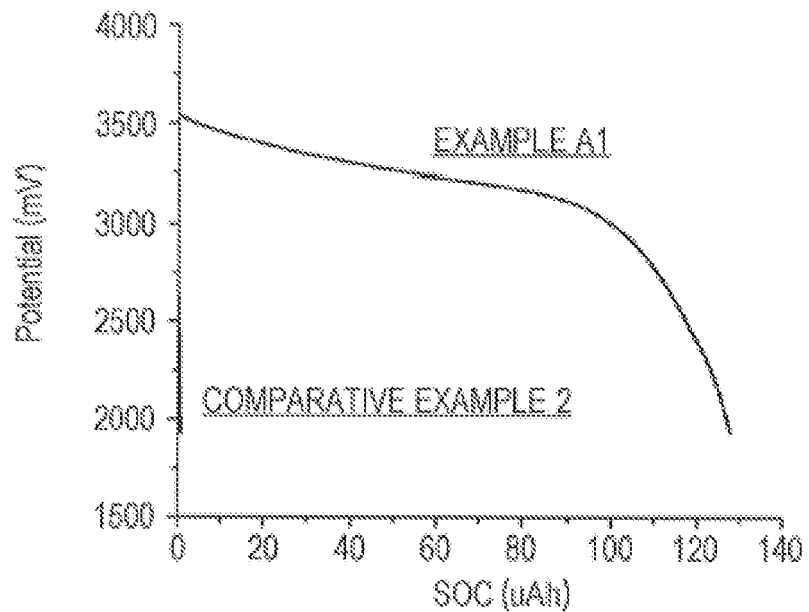
FIG. 7 is a graph showing initial discharge characteristics.

The results shown in FIG. 7 were obtained through measurement by the following method.

That is, the secondary battery of Example A1 was placed in a thermostat chamber of 25° C.

The battery was constant-current charged at a current value of 0.05 C rate (20 hour rate) with respect to the theoretical capacity of the battery, and the charge was terminated when the voltage reached 3.7 V.

Subsequently, the battery was discharged at a current value of the same 0.05 C rate as above, and the discharge was terminated when the voltage reached 1.9 V.

As a result of the measurement described above, the initial discharge capacity of the secondary battery of Example A1 was 126 μAh.

Example A2

LiCl and $YCl_3$ were used as the raw material powers of a solid electrolyte and were mixed at a molar ratio of LiCl:$YCl_3$=3:1. Consequently, $Li_3YCl_6$ was prepared as the solid electrolyte material of Example A2.

Excepting the above, evaluation and analysis were implemented as in Example A1.

The ionic conductivity measured at 22° C. was $1.1 \times 10^{-4}$ S/cm.

The temperature dependence of conductivity did not indicate phase transition within a range of −30° C. to 80° C.

The XRD pattern of the solid electrolyte material of Example A2 is shown in FIG. 6. Peaks were observed at the positions of the 2θ values of 15.8°, 31.4°, 40.9°, 48.7°, and 53.6°.

The analysis of the resulting X-ray diffraction pattern showed that the X-ray diffraction pattern corresponded to the X-ray diffraction pattern of a crystal structure having the same anion arrangement as that of an LEC structure when the lattice constants were a=11.202, b=11.202, c=6.032, α=90°, β=90°, and γ=120°.

The rate of the diffraction peak intensity ($I_{LEC(110)}$) corresponding to the (110) plane to the diffraction intensity ($I_{LEC(301)}$) in the vicinity of the diffraction peak corresponding to the LEC structure (301) plane, $I_{LEC(110)}/I_{LEC(301)}$, was 26%.

The relationship between the full width at half maximum (FWHM) and the peak central value 2θc of the diffraction peak (2θ=31.4°) corresponding to the LEC structure (301) plane was expressed as FWHM/2θc=1.8%.

The solid electrolyte material of Example A2 was used as the solid electrolyte used in the mixture and the solid electrolyte layer.

Excepting the above, production and a charge and discharge test of a secondary battery were implemented as in Example A1.

The initial discharge capacity of the secondary battery of Example A2 was 70 μAh.

Comparative Example 1

Raw material powders, LiBr and $InBr_3$, were weighed at a molar ratio of LiBr:$InBr_3$=3:1 in a dry atmosphere with a dew point of −30° C. or less and were pulverized and mixed in a mortar. Subsequently, the mixture was pressure-molded into a pellet shape to prepare a sample. The sample was vacuum-sealed in a glass tube and was fired at 200° C. for one week.

Consequently, $Li_3InBr_6$ was prepared as the solid electrolyte material of Comparative Example 1.

Excepting the above, the ionic conductivity and phase transition were evaluated as in Example A1.

The ionic conductivity measured at 22° C. was less than $1 \times 10^{-7}$ S/cm.

The temperature dependence of the ionic conductivity of the solid electrolyte material of Comparative Example 1 is shown in FIG. 5.

As shown in FIG. 5, the conductivity sharply changed at around 55° C. in the temperature-rising process due to the temperature dependence of conductivity. That is, in the solid electrolyte material of Comparative Example 1, phase transition occurred.

Comparative Example 2

LiCl and $FeCl_2$ were used as the raw material powers of a solid electrolyte and were mixed at a molar ratio of LiCl:$FeCl_2$=2:1. Consequently, $Li_2FeCl_4$ was prepared as the solid electrolyte material of Comparative Example 2.

Excepting the above, the ionic conductivity was evaluated as in Example A1.

The measured ionic conductivity was $8.7 \times 10^{-6}$ S/cm.

The solid electrolyte material of Comparative Example 2 was used as the solid electrolyte used in the mixture and the solid electrolyte layer.

Excepting the above, production and a charge and discharge test of a secondary battery were implemented as in Example A1.

The initial discharge characteristics of the secondary battery of Comparative Example 2 are shown in FIG. 7.

The initial discharge capacity of the secondary battery of Comparative Example 2 was less than 1 μAh. That is, in the secondary battery of Comparative Example 2, the charge and discharge operation was not observed.

Table 1 shows the structures in Examples A1 and A2 and Comparative Examples 1 and 2 and the results of each evaluation.

TABLE 1

| | Solid electrolyte material | Anion arrangement | FWHM/2θc (%) | Intensity ratio | Conductivity (R.T.) ($10^{-4}$ S/cm) | Phase transition (≤80° C.) | Initial discharge capacity (μAh) |
|---|---|---|---|---|---|---|---|
| Example A1 | $Li_3YBr_6$ | LEB | 2.3 | <1% (irregular) | 3.0 | Not occurred | 126 |
| Example A2 | $Li_3YCl_6$ | LEC | 1.8 | 26% (irregular) | 1.1 | Not occurred | 70 |
| Comparative Example 1 | $Li_3InBr_6$ | Not identified | N/A | N/A | <1E−3 | Occurred (about 55° C.) | — |
| Comparative Example 2 | $Li_2FeCl_4$ | Not identified | N/A | N/A | 8.7E−2 | Not occurred | <1 |

Consideration

Comparison of Examples A1 and A2 with Comparative Example 1 revealed that $Li_3YX_6$ does not cause phase transition within a range of −30° C. to 80° C. That is, it was demonstrated that the structures in Examples A1 and A2 are stable in the assumed operation temperature range of the batteries.

Comparison of Examples A1 and A2 with Comparative Examples 1 and 2 revealed that $Li_3YX_6$ shows a high ionic conductivity of $1\times10^{-5}$ S/cm or more at around room temperature.

In both Examples A1 and A2, the charge and discharge operation of the battery was observed at room temperature. In contrast, in Comparative Example 2, almost no discharge capacity was obtained, and battery operation was not observed.

Examples B1 to B8

Methods for synthesis and evaluation of $Li_{6-3z}Y_zBr_6$ will now be described.

Production of Solid Electrolyte Material

Raw material powders, LiBr and $YBr_3$, were weighed at a molar ratio of $LiBr:YBr_3=6-3z:z$ in a glove box kept in a dry and low-oxygen atmosphere with a dew point of −90° C. or less and an oxygen value of 5 ppm or less.

The "value of z" in each of Examples B1 to B8 is shown in Table 2 below.

Excepting the above, the solid electrolyte materials of Examples B1 to B8 were respectively produced as in Example A1.

Evaluation of Ionic Conductivity

Conductivity measurement cells of Examples B1 to B8 were respectively produced as in Example A1 in a glove box kept in a dry and low-oxygen atmosphere with a dew point of −90° C. or less and an oxygen value of 5 ppm or less.

Excepting the above, ionic conductivity was measured as in Example A1.

Evaluation of Phase Transition

Each of the conductivity measurement cells of Examples B1 to B8 was placed in a thermostat chamber, and the temperature dependence of conductivity was measured in a temperature-rising process and a temperature-falling process within a range of −30° C. to 80° C. As a result, in all Examples, no sharp change in conductivity indicating phase transition was observed.

Figure 9:
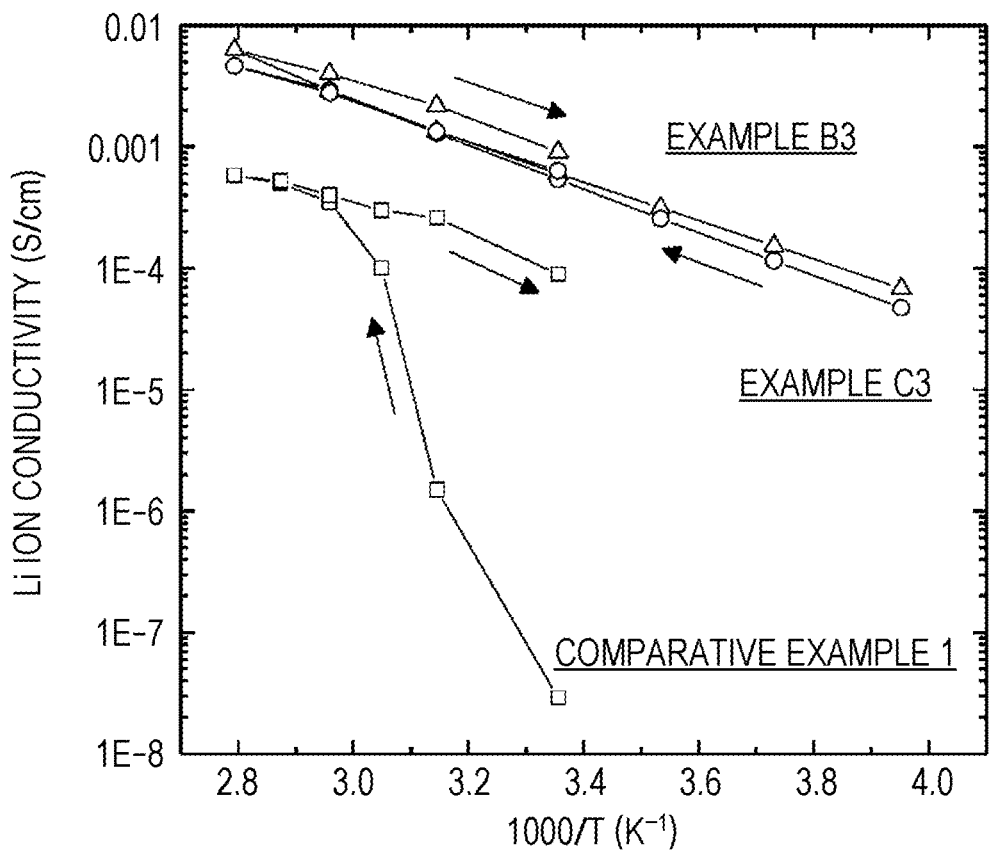
FIG. 9 is a graph showing temperature dependence of the ionic conductivity of solid electrolytes.

FIG. 9 is a graph showing temperature dependence of the ionic conductivity of solid electrolytes.

FIG. 9 shows, as a typical example, temperature dependence of the ionic conductivity in Example B3 where "z=1" (i.e., $Li_3YBr_6$).

Analysis of Crystal Structure

The crystal structure of each of the solid electrolyte materials of Examples B1 to B8 was analyzed as in Example A1.

The resulting X-ray diffraction pattern of each of the solid electrolyte materials of Examples B1 to B8 was analyzed. The results revealed that in all Examples B1 to B8, the solid electrolyte material had a crystal structure having the same anion arrangement as that of the LEB structure. In Example B3 where "z=1" (i.e., $Li_3YBr_6$), the X-ray diffraction pattern corresponded to the X-ray diffraction pattern when the lattice constants were a=6.93 angstrom, b=11.96 angstrom, c=6.84 angstrom, $\alpha=90°$, $\beta=109°$, $\gamma=90°$.

Figure 10:
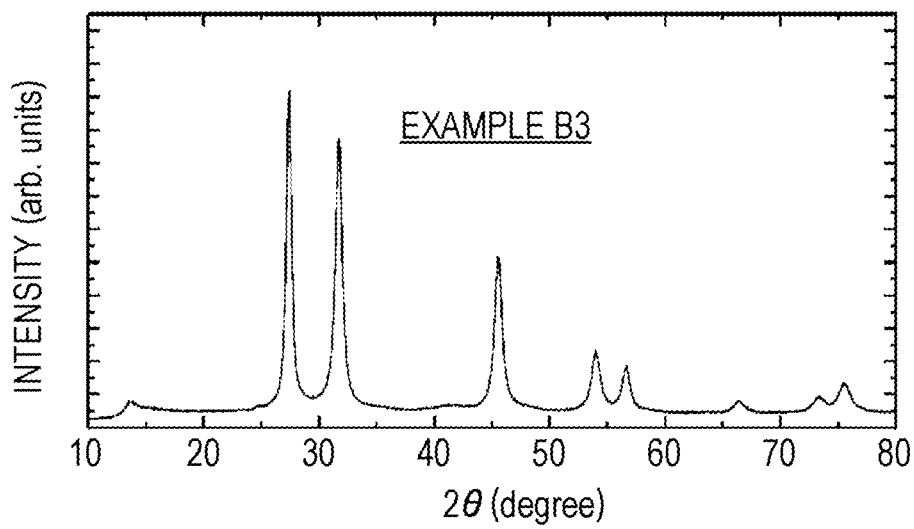
FIG. 10 is a graph showing an XRD pattern of a solid electrolyte material.

FIG. 10 is a graph showing an XRD pattern of a solid electrolyte material.

FIG. 10 shows, as a typical X-ray diffraction pattern, the pattern in Example B3 where "z=1" (i.e., $Li_3YBr_6$). Peaks were observed at positions of the of 2θ values of 13.7°, 27.4°, 31.7°, 45.5°, 54.0°, and 56.6°.

Table 2 shows the relationship between the full width at half maximum (FWHM) of the LEB (200) diffraction peak (2θ=28°) and the peak center 2 θc. In all Examples B1 to B8, FWHM/2 θc≥0.015.

Production of Secondary Battery

The respective solid electrolyte materials of Examples B1 to B8 and an active material $LiCoO_2$ were weighed at a molar ratio of 50:50 in a glove box kept in a dry and low-oxygen atmosphere with a dew point of −90° C. or less and an oxygen value of 5 ppm or less. The materials were mixed in an agate mortar to produce mixtures of Examples B1 to B8.

Excepting the above, secondary batteries of Examples B1 to B8 were produced as in Example A1.

Charge and Discharge Test

A charge and discharge test of the secondary batteries of Examples B1 to B8 was performed as in Example A1.

Figure 11:
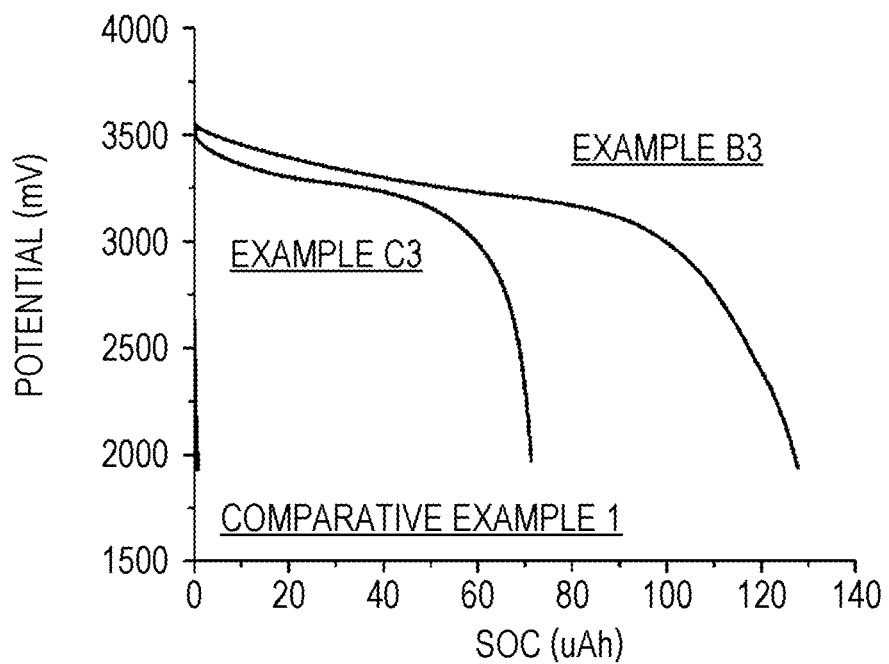
FIG. 11 is a graph showing initial discharge characteristics.

FIG. 11 is a graph showing initial discharge characteristics.

FIG. 11 shows, as typical initial discharge characteristics, the initial discharge characteristics in Example B3 where "z=1" (i.e., $Li_3YBr_6$).

Table 2 shows the structures in Examples B1 to B8 and the results of each evaluation.

TABLE 2

| | Solid electrolyte material | Value of z | Anion arrangement | FWHM/2θc (%) | Conductivity (R.T.) ($10^{-4}$ S/cm) | Phase transition (≤80° C.) | Initial discharge capacity (μAh) |
|---|---|---|---|---|---|---|---|
| Example B1 | $Li_{4.5}Y_{0.5}Br_6$ | 0.5 | LEB | 1.80 | 0.45 | Not occurred | 86 |
| Example B2 | $Li_{3.75}Y_{0.75}Br_6$ | 0.75 | LEB | 1.66 | 2.2 | Not occurred | 114 |
| Example B3 | $Li_3YBr_6$ | 1.0 | LEB | 1.88 | 3.4 | Not occurred | 126 |
| Example B4 | $Li_{2.7}Y_{1.1}Br_6$ | 1.1 | LEB | 2.14 | 4.7 | Not occurred | 135 |
| Example B5 | $Li_{2.4}Y_{1.25}Br_6$ | 1.25 | LEB | 3.79 | 4.4 | Not occurred | 120 |
| Example B6 | $Li_{1.8}Y_{1.4}Br$ | 1.4 | LEB | 4.84 | 2.5 | Not occurred | 110 |
| Example B7 | $Li_{1.5}Y_{1.5}Br$ | 1.5 | LEB | 5.51 | 1.5 | Not occurred | 95 |
| Example B8 | $Li_{0.75}Y_{1.75}Br$ | 1.75 | LEB | 6.27 | 0.4 | Not occurred | 60 |

Examples C1 to C8

Methods for synthesis and evaluation of $Li_{6-3z}Y_zCl_6$ will now be described.

Production of Solid Electrolyte Material

Raw material powders, LiCl and $YCl_3$, were weighed at a molar ratio of $LiCl:YCl_3=6-3z:z$ in a glove box kept in a dry and low-oxygen atmosphere with a dew point of −90° C. or less and an oxygen value of 5 ppm or less.

The "value of z" in each of Examples C1 to C8 is shown in Table 3 below.

Excepting the above, the solid electrolyte materials of Examples C1 to C8 were respectively produced as in Example A1.

Evaluation of Ionic Conductivity

Conductivity measurement cells of Examples C1 to C8 were respectively produced as in Example A1 in a glove box kept in a dry and low-oxygen atmosphere with a dew point of −90° C. or less and an oxygen value of 5 ppm or less.

Excepting the above, ionic conductivity was measured as in Example A1.

Evaluation of Phase Transition

Each of the conductivity measurement cells of Examples C1 to C8 was placed in a thermostat chamber, and the temperature dependence of conductivity was measured in a temperature-rising process and a temperature-falling process within a range of −30° C. to 80° C. As a result, in all Examples, no sharp change in conductivity indicating phase transition was observed.

FIG. 9 shows, as a typical example, temperature dependence of ionic conductivity in Example C3 where "z=1" (i.e., $Li_3YCl_6$).

Analysis of Crystal Structure

The crystal structure of each of the solid electrolyte materials of Examples C1 to C8 was analyzed as in Example A1.

The resulting X-ray diffraction pattern of each of the solid electrolyte materials of Examples C1 to C8 was analyzed. The results revealed that in all Examples C1 to C8, the solid electrolyte material had a crystal structure having the same anion arrangement as that of the LYC structure. In Example C3 where "z=1" (i.e., $Li_3YCl_6$), the X-ray diffraction pattern corresponded to the X-ray diffraction pattern when the lattice constants (lattice constants of the unit cell defined by the LYC structure) were a=12.93 angstrom, b=11.202 angstrom, c=6.04 angstrom, α=90°, β=90°, and γ=90°.

Figure 12:
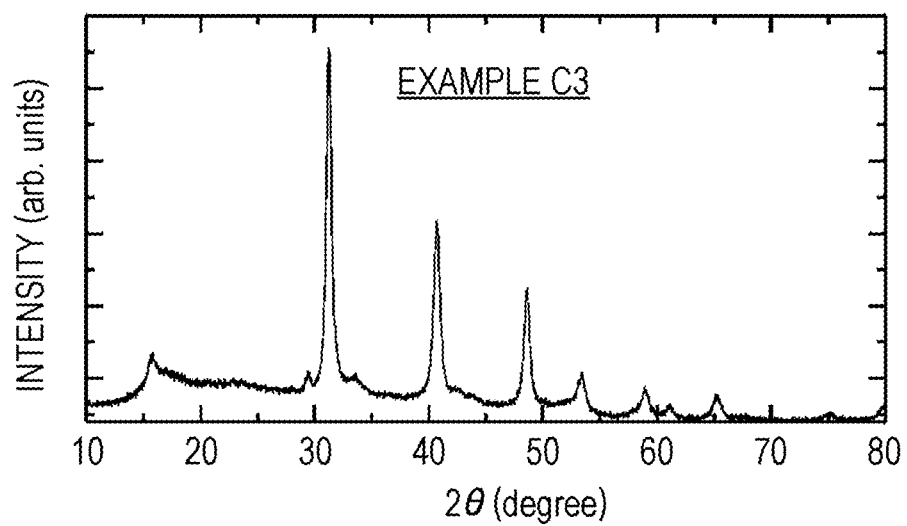
FIG. 12 is a graph showing an XRD pattern of a solid electrolyte material.

FIG. 12 is a graph showing an XRD pattern of a solid electrolyte material.

FIG. 12 shows, as a typical X-ray diffraction pattern, the patter in Example C3 where "z=1" (i.e., $Li_3YCl_6$). Peaks were observed at positions of the 2θ values of 15.8°, 31.2°, 40.7°, 48.6°, and 53.4°.

Table 3 shows the relationship between the full width at half maximum (FWHM) of the LYC(231) diffraction peak and the peak center 2 θc. In all Examples C1 to C8, FWHM/2 θc≥0.015.

Production of Secondary Battery

The respective solid electrolyte materials of Examples C1 to C8 and an active material $LiCoO_2$ were weighed at a molar ratio of 50:50 in a glove box kept in a dry and low-oxygen atmosphere with a dew point of −90° C. or less and an oxygen value of 5 ppm or less. The materials were mixed in an agate mortar to produce mixtures of Examples C1 to C8.

Excepting the above, secondary batteries of Examples C1 to C8 were produced as in Example A1.

Charge and Discharge Test

A charge and discharge test of the secondary batteries of Examples C1 to C8 was performed as in Example A1.

FIG. 11 shows, as typical initial discharge characteristics, the initial discharge characteristics in Example C3 where "z=1" (i.e., $Li_3YCl_6$).

Table 3 shows the structures in Examples C1 to C8 and the results of each evaluation.

TABLE 3

| | Solid electrolyte material | Value of z | Anion arrangement | FWHM/2θc (%) | Conductivity (R.T.) ($10^{-4}$ S/cm) | Phase transition (≤80° C.) | Initial discharge capacity (μAh) |
|---|---|---|---|---|---|---|---|
| Example C1 | $Li_{4.5}Y_{0.5}Cl_6$ | 0.5 | LYC | 1.65 | 0.2 | Not occurred | 40 |
| Example C2 | $Li_{3.75}Y_{0.75}Cl_6$ | 0.75 | LYC | 1.70 | 1 | Not occurred | 64 |
| Example C3 | $Li_3YCl_6$ | 1.0 | LYC | 1.75 | 5.7 | Not occurred | 70 |
| Example C4 | $Li_{2.7}Y_{1.1}Cl_6$ | 1.1 | LYC | 1.60 | 7.1 | Not occurred | 80 |
| Example C5 | $Li_{2.4}Y_{1.25}Cl_6$ | 1.25 | LYC | 1.80 | 4.4 | Not occurred | 80 |
| Example C6 | $Li_{1.8}Y_{1.4}Cl_6$ | 1.4 | LYC | 1.70 | 2.7 | Not occurred | 75 |
| Example C7 | $Li_{1.5}Y_{1.5}Cl_6$ | 1.5 | LYC | 2.50 | 1.5 | Not occurred | 73 |
| Example C8 | $Li_{0.75}Y_{1.75}Cl_6$ | 1.75 | LYC | 3.60 | 0.5 | Not occurred | 50 |

Consideration

Comparison of Examples B1 to B8 and C1 to C8 with Comparative Example 1 revealed that in Examples B1 to B8 and C1 to C8, phase transition does not occur within a range of −30° C. to 80° C. That is, it was demonstrated that the structures in Examples B1 to B8 and C1 to C8 are stable in the assumed operation temperature range of the batteries.

Comparison of Examples B1 to B8 and C1 to C8 with Comparative Examples 1 and 2 revealed that in Examples B1 to B8 and C1 to C8, a high ionic conductivity of $1\times10^{-5}$ S/cm or more was shown at around room temperature.

In addition, in all Examples B1 to B8 and C1 to C8, the charge and discharge operation of the battery was observed in room temperature. In contrast, in Comparative Example 2, almost no discharge capacity was obtained, and battery operation was not observed.

Comparison of Examples B2 to B7 and C2 to C7 with Examples B1, B8, C1, and C8 revealed that in Examples B2 to B7 and C2 to C7, a high ionic conductivity of $1\times10^{-4}$ S/cm or more was shown at around room temperature. Consequently, it is demonstrated that a higher ionic conductivity is achieved by satisfying 0.75≤z≤1.5.

Comparison of Examples B3 to B5 and C3 to C5 with Examples B1, B2, B6 to B8, C1, C2, and C6 to C8 revealed that in Examples B3 to B5 and C3 to C5, a high ionic conductivity of $3\times10^{-4}$ S/cm or more was shown at around room temperature. Consequently, it is demonstrated that a higher ionic conductivity is achieved by satisfying 1≤z≤1.25.

Consequently, it is demonstrated that the solid electrolyte material according to the present disclosure is an electrolyte material not generating hydrogen sulfide and capable of stably maintaining a high lithium ion conductivity. It is furthermore demonstrated that the solid electrolyte material can achieve an all-solid battery that does not generate hydrogen sulfide and has excellent charge and discharge characteristics.

INDUSTRIAL APPLICABILITY

The battery of the present disclosure can be used as, for example, an all-solid-state lithium secondary battery.

What is claimed is:

1. A solid electrolyte material represented by the following Compositional Formula (1):

$$Li_{6-3z}Y_zX_6$$

where 0<z<2 is satisfied; and
X represents Cl; wherein
the solid electrolyte material includes at least one fifth crystal phase; and the fifth crystal phase shows, in structural analysis of the fifth crystal phase through X-ray diffractometry by a θ-2θ method using Cu-Kα rays having wavelengths of 1.5405 angstrom and 1.5444 angstrom as the X-ray, peaks within ranges of diffraction angle 2θ values of 15.3° to 16.3°, 29.8° to 32°, 38.5° to 41.7°, 46.3° to 50.4°, and 50.8° to 55.4°;

and wherein:
$FWHM_5$ denoting a full width at half maximum of the X-ray diffraction peak observed within the range of 29.8° to 320 in the X-ray diffractometry using Cu-Kα rays, and
$2\theta c_5$ denoting a diffraction angle at the center of the X-ray diffraction peak satisfy:

$$FWHM_5/2\theta c_5 \geq 0.015.$$

2. The solid electrolyte material according to claim 1, wherein
0.75 z 1.5 is satisfied.

3. The solid electrolyte material according to claim 2, wherein
1≤z≤1.25 is satisfied.

4. The solid electrolyte material according to claim 1, wherein
the solid electrolyte material includes at least one second crystal phase; and
in the second crystal phase, the arrangement of halogen X is the same as that of Cl in $Li_3ErCl_6$ having a crystal structure belonging to space group P-3 m1.

5. The solid electrolyte material according to claim 4, wherein
$I_{LEC(301)}$ denoting an X-ray diffraction intensity of a plane of the second crystal phase corresponding to a (301) plane of the $Li_3ErCl_6$ crystal structure, and
$I_{LEC(110)}$ denoting an X-ray diffraction intensity of a plane of the second crystal phase corresponding to a (110) plane of the $Li_3ErCl_6$ crystal structure satisfy:

$$I_{LEC(110)}/I_{LEC(301)} < 0.3.$$

6. The solid electrolyte material according to claim 4, wherein
$FWHM_2$ denoting a full width at half maximum of an X-ray diffraction peak of a plane of the second crystal phase corresponding to a (301) plane of the $Li_3ErCl_6$ crystal structure, and
$2\theta c_2$ denoting a diffraction angle at the center of the X-ray diffraction peak satisfy:

$$FWHM_2/2\theta c_2 \geq 0.015.$$

7. The solid electrolyte material according to claim 4, wherein
the solid electrolyte material includes a heterogeneous crystal phase having a crystal structure different from that of the second crystal phase; and
the heterogeneous crystal phase lies between the second crystal phases.

8. The solid electrolyte material according to claim 4, wherein
the solid electrolyte material includes an amorphous phase; and
the amorphous phase lies between the second crystal phases.

9. The solid electrolyte material according to claim 1, wherein
the solid electrolyte material includes at least one third crystal phase; and
in the third crystal phase, the arrangement of halogen X is the same as that of Cl in $Li_3YbCl_6$ having a crystal structure belonging to space group Pnma.

10. The solid electrolyte material according to claim 9, wherein
$FWHM_3$ denoting a full width at half maximum of an X-ray diffraction peak of a plane of the third crystal phase corresponding to a (231) plane of the $Li_3YbCl_6$ crystal structure, and
$2\theta c_3$ denoting a diffraction angle at the center of the X-ray diffraction peak satisfy:

$FWHM_3/2\theta c_3 \geq 0.015$.

11. The solid electrolyte material according to claim 9, wherein
the solid electrolyte material includes a heterogeneous crystal phase having a crystal structure different from that of the third crystal phase; and
the heterogeneous crystal phase lies between the third crystal phases.

12. The solid electrolyte material according to claim 9, wherein
the solid electrolyte material includes an amorphous phase; and
the amorphous phase lies between the third crystal phases.

13. The solid electrolyte material according to claim 1, wherein
in the X-ray diffractometry using Cu-Kα rays, $I_3$ denoting an intensity of the diffraction peak appearing within the range of 29.8° to 320 and $I_4$ denoting an intensity of the diffraction peak appearing within the range of 15.3° to 16.3° satisfy:

$I_4/I_3 < 0.3$.

14. The solid electrolyte material according to claim 1, wherein
the solid electrolyte material includes a heterogeneous crystal phase having a crystal structure different from that of the fifth crystal phase; and
the heterogeneous crystal phase lies between the fifth crystal phases.

15. The solid electrolyte material according to claim 1, wherein
the solid electrolyte material includes an amorphous phase; and
the amorphous phase lies between the fifth crystal phases.

16. A battery comprising:
the solid electrolyte material according to claim 1;
a positive electrode;
a negative electrode; and
an electrolyte layer disposed between the positive electrode and the negative electrode, wherein
at least one of the negative electrode and the electrolyte layer contains the solid electrolyte material.

* * * * *